United States Patent [19]
Supino et al.

[11] Patent Number: 5,982,721
[45] Date of Patent: Nov. 9, 1999

[54] OPTICAL DISC DRIVE COMPRISING SWITCHING GAINS FOR FORCING PHASE STATES TO FOLLOW A SLIDING LINE TRAJECTORY IN A SERVO SYSTEM

[75] Inventors: Louis Supino; Paul M. Romano, both of Boulder; Francis H. Reiff, Broomfield, all of Colo.

[73] Assignee: Cirrus Logic, Inc., Fremont, Calif.

[21] Appl. No.: 08/625,462

[22] Filed: Mar. 29, 1996

[51] Int. Cl.$^6$ .................................................... G11B 7/085
[52] U.S. Cl. ..................................... 369/44.28; 369/44.29; 369/44.35; 369/54
[58] Field of Search .............................. 369/44.11, 44.25, 369/44.26, 44.28–44.29, 44.32, 44.34, 44.35, 44.36, 54, 58

[56] References Cited

U.S. PATENT DOCUMENTS

| | | | |
|---|---|---|---|
| 4,713,596 | 12/1987 | Bose . | |
| 5,060,215 | 10/1991 | Kawamura et al. | 369/44.35 |
| 5,132,948 | 7/1992 | Ishibashi | 369/44.34 |
| 5,233,585 | 8/1993 | Dente et al. | 369/44.27 |
| 5,341,078 | 8/1994 | Torii et al. . | |
| 5,345,348 | 9/1994 | Suzuki | 360/78.07 |
| 5,351,224 | 9/1994 | Nagata et al. | 369/44.29 |
| 5,363,357 | 11/1994 | Niwayama | 369/44.27 |
| 5,367,513 | 11/1994 | Bates et al. | 369/44.29 |
| 5,384,762 | 1/1995 | Kagami et al. | 369/44.28 |
| 5,399,849 | 3/1995 | Jung | 250/201.5 |
| 5,404,346 | 4/1995 | Koyama et al. | 369/44.32 |
| 5,406,535 | 4/1995 | Seo et al. | 369/44.28 |
| 5,412,636 | 5/1995 | Hasimoto et al. | 369/44.32 |
| 5,416,756 | 5/1995 | Takeshita et al. | 369/32 |
| 5,416,759 | 5/1995 | Chun | 369/44.36 |
| 5,432,763 | 7/1995 | Campbell et al. | 369/44.19 |
| 5,436,877 | 7/1995 | Ohshima | 369/44.35 |
| 5,438,557 | 8/1995 | Ito et al. | 369/44.32 |
| 5,442,270 | 8/1995 | Tetsauki . | |
| 5,446,711 | 8/1995 | Yamamiya | 369/44.14 |
| 5,459,624 | 10/1995 | Erickson et al. | 360/77.02 |

FOREIGN PATENT DOCUMENTS

| | | |
|---|---|---|
| 0 013 326 | 7/1980 | European Pat. Off. . |
| 0494500A1 | 7/1992 | European Pat. Off. . |
| 44 05 087 | 8/1994 | Germany . |

OTHER PUBLICATIONS

M. Ogawa and T. Furukawa, "Robust Servo System of Optical Disk Drive, " *Japanese Journal of Applied Physics*, vol. 31, No. 2B, Feb. 1, 1992, pp. 643–647.

Chandrasekhar Namuduri and Paresh C. Sen, "A Servo–Control System Using a Self–Controlled Synchronous Motor (SCSM) With Sliding Mode Controller", *IEEE Trans. on Industry Applications*, vol IA–23, No. 2, Mar./Apr. 1987.

John Y, Hung, Weibing Gao, and James C, Hung, "Variable Structure Control: A Survey", *IEEE Trans. on Industrial Electronics*, vol. 40, No. 1, Feb. 1993.

Katsuhisa Furuta, "Sliding Mode Control of a Discrete System", *Systems & Control Letters*, vol. 14, No. 2, Feb. 1990.

(List continued on next page.)

*Primary Examiner*—W. R. Young
*Attorney, Agent, or Firm*—Howard Sheerin; Dan A. Shifrin

[57] ABSTRACT

An optical disc storage system comprises a sliding mode controller for actuating an optical read head assembly over an optical disc during focus capture, focus tracking, track seeking and centerline tracking. The sliding mode controller is a non-linear control system which operates by switching between positive and negative feedback in order to force certain phase states (such as the read head's position error and velocity) to follow a predetermined phase state trajectory. Sliding mode control provides improved compensation to parametric variations, external load disturbances and other transients such as, for example, the focus capture transient. Furthermore, the sliding mode positive and negative feedback gains need only be within a predetermined range, thereby allowing gain values of $2^n$ which significantly reduces the complexity and cost of the gain multipliers.

15 Claims, 28 Drawing Sheets

OTHER PUBLICATIONS

J.C. Hung, "Chattering Handling for Variable Structure Control Systems", *Proceedings of the IECON '93*, vol. 3, 1993.

Raymond A. DeCarlo, Stanislaw H. Zak, and Gregory Mathews, "Variable Structure Control Of Non–linear Multivariable Systems: A Tutorial", *Proceedings of the IEEE*, vol. 76, No. 3, Mar. 1988.

V.I. Utkin, "Discontinuous Control System: State of Art In Theory and Applications", *Automatic Control World congress 1987*, vol. 1.

G.C. Verghese, B. Fernandez R., and J.K. Hedrick, "Stable, Robust Tracking by Sliding Mode control", *Systems & Control Letters*, vol. 10, 1988.

Kar–Keung D. Young and Harry G. Kwatny, "Variable Structure Servomechanism Design and Applications to Overspeed Protection Control", *1982 International Federation of Automatic Control*.

Weibing Gao and James C. Hung, "Variable Structure Control of Nonlinear Systems: A New Approach", *IEEE Trans. on Industrial Electronics*, vol. 40, No. 1, Feb. 1993.

M.A. El–Sharkawi, "Development and Implementation of High Performance Variable Structure Tracking Control For Brushless Motors", *IEEE/PES 1990 Summer Meeting*, Mineapolis, minnesota, Jul. 15–19, 1990.

Weibing Gao, Yufu Wang, and Abdollah Himaifa, "Discrete–Time Variable Structure Control Systems", *IEEE Trans. on Industrial Electronics*, vol. 42, No. 2, Apr. 1995.

OPTICAL DISC DRIVE COMPRISING SWITCHING GAINS FOR FORCING PHASE STATES TO FOLLOW A SLIDING LINE TRAJECTORY IN A SERVO SYSTEM

FIELD OF INVENTION

The present invention relates to optical storage systems, particularly to controlling the read head actuator in an optical disc drive.

BACKGROUND OF THE INVENTION

Optical disc drives, such as CD-ROMs, are commonly used for storing large amounts of digital data on a single disc for use in audio/video or computer applications, and the like. The data on an optical disc is typically recorded as a series of "pits" arranged in tracks, where the length of the pit determines the presence of a digital "0" bit or a "1" bit. To read this recorded data, a servo system focuses a laser beam onto the surface of the disc such that the characteristics of the reflected beam allow detection of the data pits.

To this end, the servo system performs four operations: (1) a capture operation to "pull-in" the initial focus position, (2) a seek operation to move the beam to a desired track, (3) a centerline tracking operation to maintain the beam over the centerline of the selected track while reading the recorded data, and (4) a focus tracking operation to maintain proper focus as the disc spins over the beam.

Conventional optical disc drives use a head assembly comprised of a laser diode for generating the laser beam which is focused onto the surface of the optical disc through an objective lens. FIG. 1A illustrates a typical three beam optical head assembly, the operation of which is well known by those skilled in the art. A laser diode 1 produces a light beam which passes through a diffraction grating (not shown) splitting the main beam into three separate beams 2 (a center beam and two side beams); the three beams 2 then pass through a polarization beam splitter 3 and a collimator lens (not shown). The light beams 2 are then reflected by a prism 4, through an object lens (OL) 5, and onto the surface of the optical disc (not shown). The beams 2 reflect off the optical disc, again pass through the OL 5, and then reflect off the prism 4 back toward the polarization prism 3. The polarization prism 3 deflects the center beam onto a quadrant photodetector 6, and deflects the two side beams onto two tracking photodiodes (7A, 7B). The quadrant photodetector 6 generates a focus error signal (FES) for focusing the OL 5, and it generates an RF read signal for reading the recorded data. The tracking photodiodes (7A,7B) generate a tracking error signal (TES) used to maintain the position of the OL 5 over the centerline of a selected track while reading data from the disc.

In order to position the read head over a selected track during a seek operation, the entire sled assembly 8 slides radially along a lead screw 9 underneath the optical disc until the read head is positioned near the desired track. This coarse positioning (or coarse seeking) is accomplished by rotating the lead screw 9 in a clockwise or counterclockwise direction. Once near the selected track, OL voice coil motors (VCMs) (10A,10B) rotate an OL carriage unit 11 about a plastic hinge 12 in a "fine seeking" operation until the OL 5 is positioned directly over the desired track. Then, as the disc rotates and the track passes under the read head, the OL VCMs (10A,10B) perform fine adjustments in a "tracking" operation in order to maintain the position of the OL 5 over the centerline of the selected track as information is read from the disc.

The OL VCMs (10A,10B) can rotate the OL carriage unit 11, and thereby the OL 5, about the plastic hinge 12 in a range that spans approximately 200 tracks on either side of its center position. Thus, if during a seek operation the selected track is within 200 tracks of the current track, the OL carriage unit 11 can perform the entire seek operation without needing to slide the sled assembly 8 along the lead screw 9. At the end of a short seek operation and while tracking the centerline of the selected track, the lead screw 9 slowly slides the sled assembly 8 toward the selected track until the OL carriage unit 11 is again in its center position.

The OL VCMs (10A,10B) also move the OL carriage unit 11 up and down in the direction shown in order to "capture" and "track" the OL 5 focus position. For focus capture and focus tracking the quadrant photodetector 6 generates an astigmatic focus error signal indicative of the distance between the OL 5 and the optical disc. At the beginning of a capture operation, the OL carriage unit 1 is initially positioned sufficiently away from the disc so that it is out-of-focus. Then the OL VCMs (10A,10B) slowly move the OL carriage unit 11 toward the disc with the focus servo loop open until the quadrant photodetector 6 indicates that the OL 5 is within its focus pull-in range. Once within the pull-in range, the focus servo loop is closed and the initial focus point is captured. Thereafter, the OL VCMs (10A,10B) track the in-focus position in response to the astigmatic focus error signal (FES) as the read head seeks to selected tracks and reads data from the disc.

FIG. 1B illustrates how the changing image on the quadrant photodetector 6 generates the focus error signal (FES). When the disc surface lies precisely at the focal point of the OL 5, a circular spot strikes the center of the quadrant photodetector 6. When the distance between the disc and the OL 5 decreases, the reflected image becomes elliptical. Similarly, when the distance between the disc and the OL 5 increases, an elliptical pattern again results, only rotated 90 degrees from the first elliptical pattern. Thus, as shown in FIG. 1C, the quadrant photodetector 6 generates the focus error signal (FES) according to (A+C)−(B+D), and it generates the RF read signal according to (A+B+C+D). FIG. 1D is a plot of the focus error signal (FES) versus the distance between the OL 5 and the optical disc, where the linear region defines the focus "pull-in" range for the focus capture operation.

Similar to the quadrant photodetector 6, the tracking photodiodes (7A,7B) generate a tracking error signal (TES) used by the servo control system to maintain the OL 5 over the centerline of the selected track as the disc spins over the beam. FIG. 1E shows how the tracking photodiodes (7A,7B) generate the tracking error signal (TES) according to the intensity of the side beams. When positioned perfectly over the track's centerline, the tracking error signal is zero. When positioned to the left or right of the centerline, the tracking error signal (TES) is positive or negative, respectively. Thus, the tracking error signal (TES) is generated as (E−F) as illustrated by FIG. 1F. FIG. 1G is a plot of the tracking error signal (TES) versus the mistracking, where the linear region indicates the pull-in region for the tracking operation.

There are many difficulties inherent in controlling the read head actuator of an optical disc drive relative to focus capture, focus tracking, track seeking and centerline tracking. One significant aspect is the wide range of parametric variations that can occur due to internal factors, such as temperature and volt drift, as well as parametric variations in the servo system between disc drives. The servo system must be able to compensate for these parametric variations in order to perform adequately at the ever increasing data rates and densities.

Yet another problem is that the above described capture operation does not always end successfully; rather it can fail due to over shooting the pull-in range as defined by the linear region of the focus error signal (FES) shown in FIG. 1D. That is, there is a significant capture transient associated with closing the focus servo loop (see FIG. 14A) that varies with such factors as the relative disk/head velocity variation, surface contaminations and the driving force of the focus VCMs. For this reason, optical storage devices are generally designed to repeat the capture operation several times.

Still another problem is maintaining focus during seek operations which presents a significant external disturbance to the focus servo loop. If the focus is lost during a seek, the storage system must pause to perform a focus capture operation which can significantly increase the seek time.

Yet another problem associated with optical disc servo systems is the optical coupling or feed through phenomena that occurs between the focus tracking and centerline tracking loops. U.S. Pat. No. 5,367,513 discloses one solution to the optical feedthrough problem, but it has disadvantages which are overcome by the present invention—mainly, cost of implementation.

Conventional servo systems found in optical storage systems typically implement a linear controller using Proportional-Integral-Derivative (PID) feedback and/or state estimators. The problem with conventional linear controllers, however, is they are sensitive to parametric variations in the servo system and to external load disturbances. Conventional adaptive linear controllers overcome this sensitivity problem by executing complex calibration routines or by continuously re-programming the controller to compensate for the parameter variations and load disturbances. However, adaptive linear controllers are complex and may require notch filters for filtering out mechanical resonances. Furthermore, conventional linear controllers are not adept to the above described problems inherent in controlling an actuator for an optical disc drive.

There is, therefore, a need for an optical disc drive servo control system that is less sensitive to parametric variations, provides better control of transients, and avoids the implementation cost of a complex, adaptive linear controller.

SUMMARY OF THE INVENTION

An optical disc storage system comprises a sliding mode controller for actuating an optical read head assembly over an optical disc during focus capture, focus tracking, track seeking and centerline tracking. The sliding mode controller is a non-linear control system which operates by switching between positive and negative feedback in order to force certain phase states (such as the read head's position error and velocity) to follow a predetermined phase state trajectory. The positive and negative feedback gains need only be within a predetermined range, thereby allowing gain values of $2^n$ which significantly reduces the complexity and cost of the gain multipliers.

The resulting servo control system overcomes many of the inherent difficulties in actuating an optical read head, and at a much lower cost than conventional adaptive linear controllers. Specifically, it provides robust compensation for parametric variations that can occur due to such factors as temperature and voltage drift and parametric variations that occur between individual disc drives. Furthermore, sliding mode control better compensates for transients caused by external load disturbances as well as the transient associated with closing the servo loop during focus capture. Still further, sliding mode control provides a less complex solution to the above mentioned optical coupling between the focus tracking and centerline tracking servo loops.

BRIEF DESCRIPTION OF THE DRAWINGS

The above and other aspects and advantages of the present invention will be better understood by reading the following detailed description of the invention in conjunction with the drawings, wherein:

FIG. 5 shows a typical servo actuator modeled as a second order system having a position error and position error velocity phase state.

DETAILED DESCRIPTION OF THE DRAWINGS

System Overview

Figure 1A:
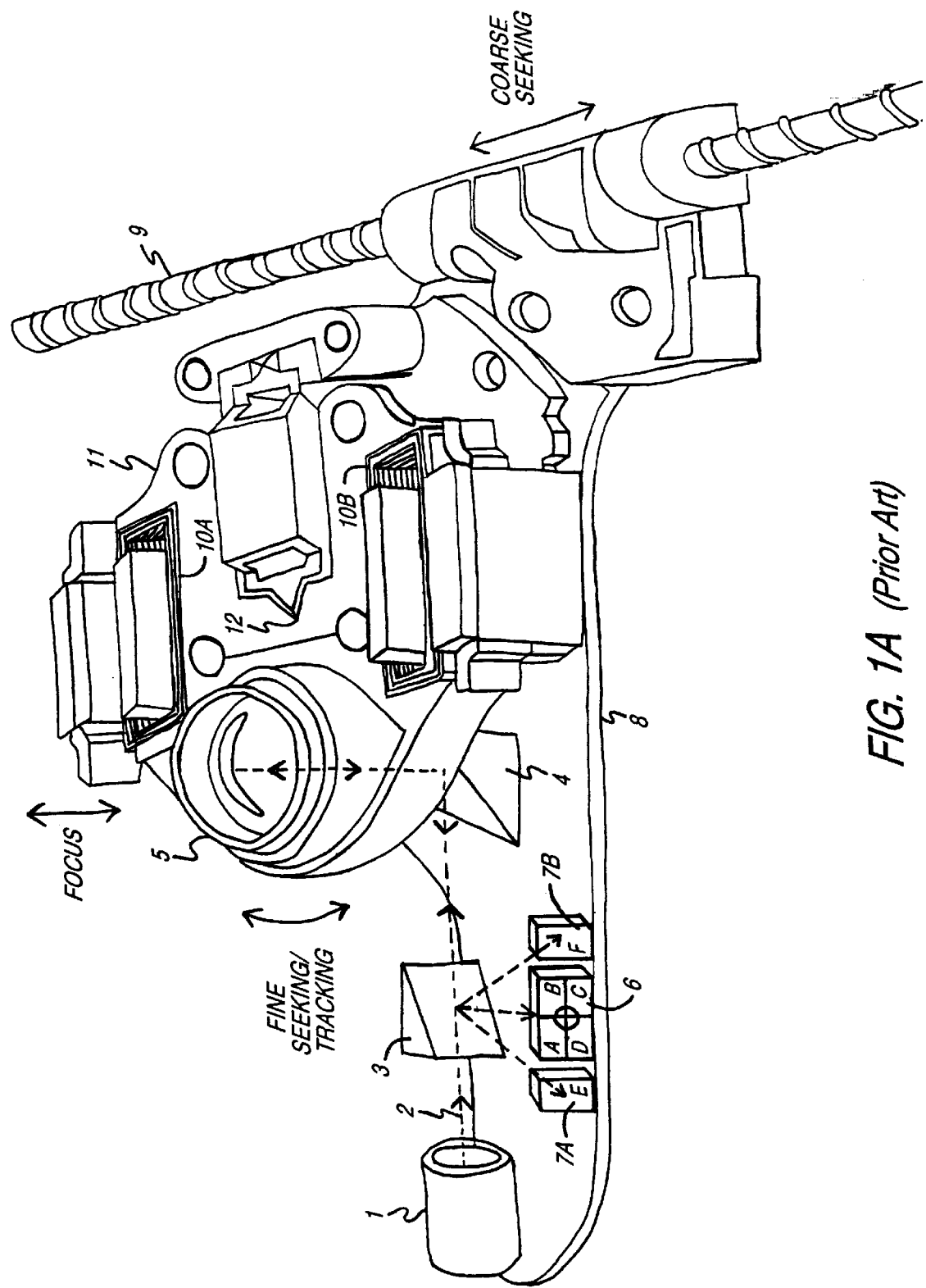
FIG. 1A is a block diagram of a conventional three beam optical read head assembly including the servo optical sensing circuits used for focus capture, focus tracking and centerline tracking.
Figure 1B:
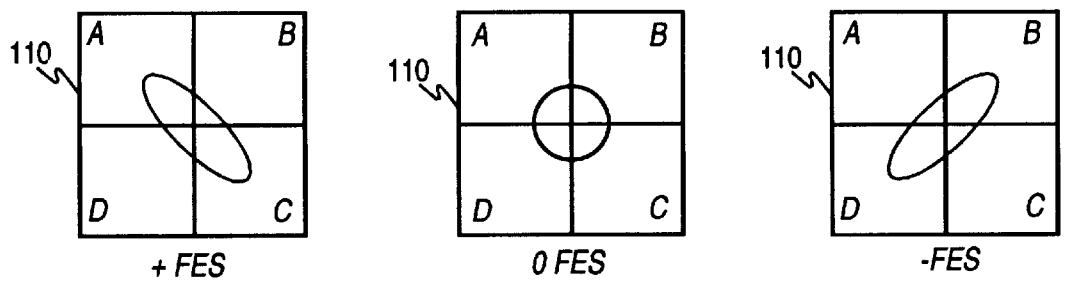
FIG. 1B shows the various patterns which may be generated on a quadrant photodetector based on the focus condition of the laser beam.
Figure 1C:
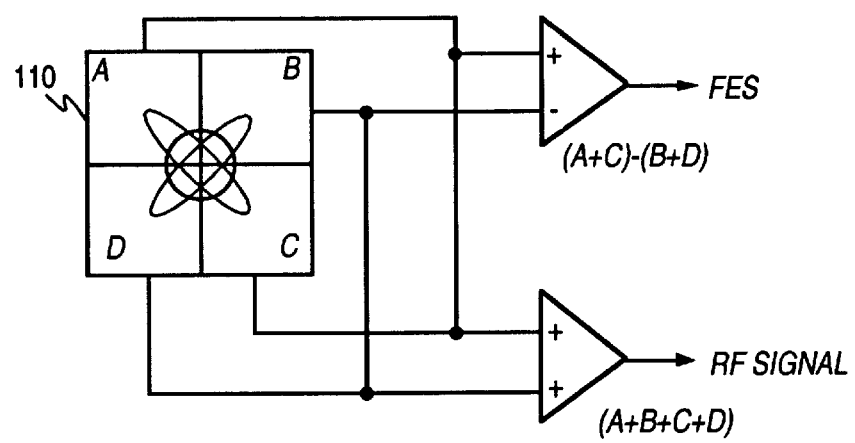
FIG. 1C illustrates how to generate a focus error signal (FES) and an RF read signal from the quadrant photodetector.
Figure 2A:
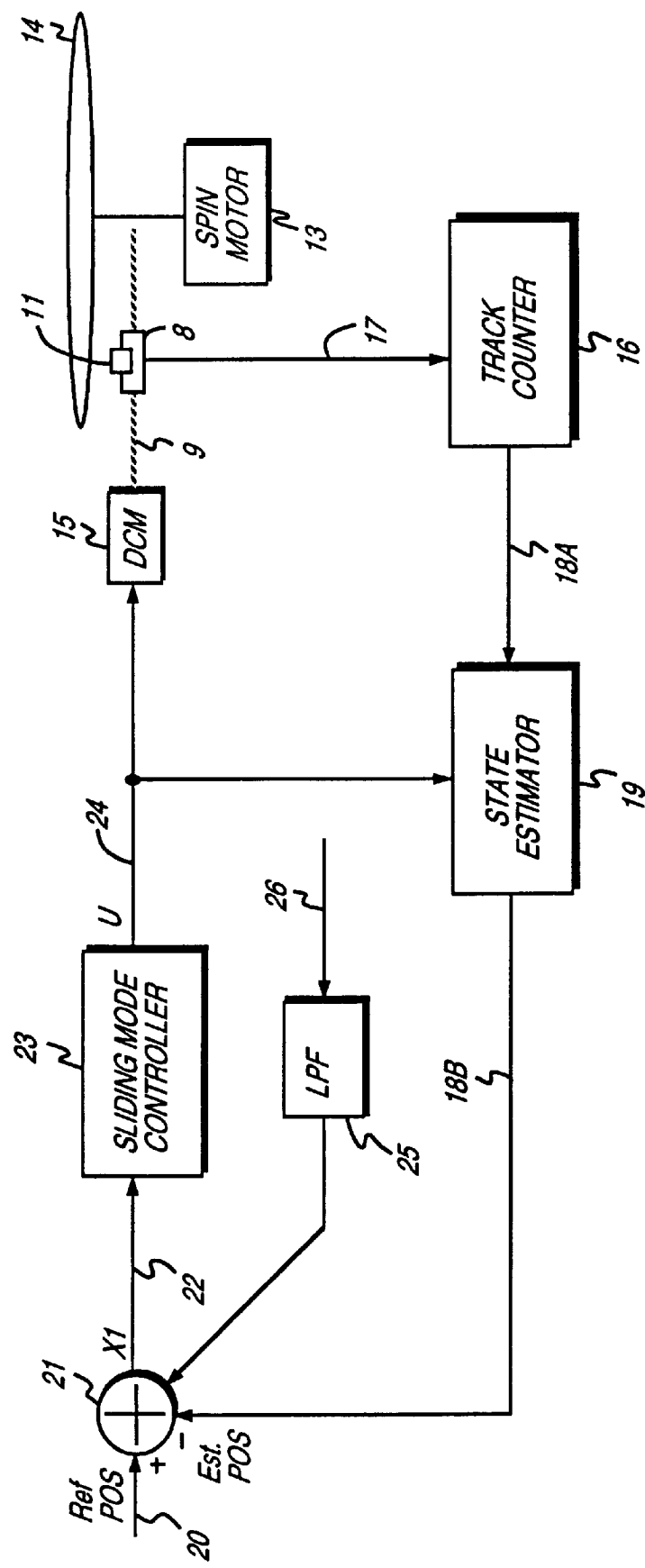
FIG. 2A and 2B are exemplary block diagrams of the disc drive control systems according to the present invention.

FIG. 2A is an overview of the optical disc drive servo control system of the present invention which implements the coarse seeking operation. A spin motor 13 spins an optical disc 14 with computer data recorded thereon over an optical read head assembly 8. The read head assembly 8, as described above with reference to FIG. 1A, comprises an objective lens (OL) 5 for focusing a laser beam onto the disc. During a coarse seek operation, the read head assembly 8 slides radially under the disc 14 along a lead screw 9 until positioned under a selected track. A DC motor (DCM) 15 rotates the lead screw 9 in order to effectuate the coarse seek operation. A track counter 16, connected to receive an RF read signal 17 from the read head 8, detects track crossings and generates an estimated read head track position 18A. Other well known methods for detecting the read head track position, such as shaft encoders or Hall sensors, may be used in place of the track counter 16. A state estimator 19 processes the estimated track position 18A and the DCM motor control signal 24 to generate a more accurate estimated position (Est. POS) 18B. The Est. POS 18B is subtracted from a reference position (Ref. POS) 20 and the OL carriage unit VCM control signal 26 (after low pass filtering 25) at adder 21 to generate a position error signal X1 22. The reference position (Ref. POS) 20 indicates the selected track from which data is to be read. A sliding mode controller 23, responsive to the position error X1 22, computes a motor control signal U 24 applied to the DCM 15, thereby sliding the read head 8 to the selected track.

Track counters 16 for use in optical disc storage systems are well known by those skilled in the art, an example of such is disclosed in U.S. Pat. No. 5,406,535 the disclosure of which is hereby incorporated by reference.

The state estimator 19 filters out errors in the track position information caused by noise in the recording channel and errors generated by the track position transducer (track counter 16). In the embodiment of the sliding mode controller shown in FIG. 6, the state estimator 19 can also replace the differentiator 102 in order to generate the position error velocity phase state X2. State estimators are well known by those skilled in the art, with one example described in U.S. Pat. No. 4,679,103, the disclosure of which is hereby incorporated by reference. In addition to state estimators, other well known techniques may be used for generating the actuator phase states without departing from the scope of the present invention.

Figure 2B:
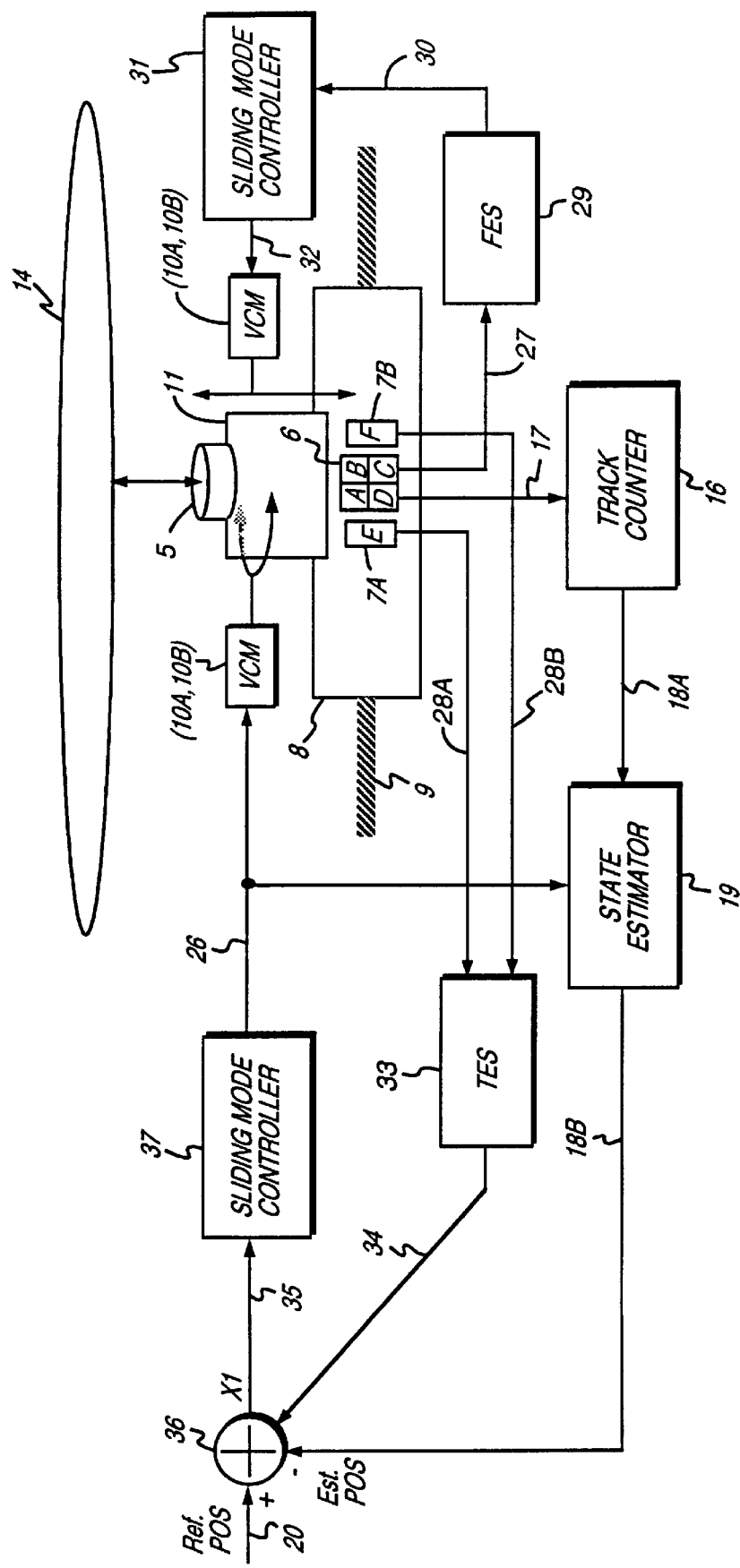

Referring now to FIG. 2B, shown is a sliding mode control system of the present invention used for focus capture, focus tracking, fine seeking and centerline tracking. As discussed above with reference to FIG. 1A, the read head assembly 8 comprises an objective lens (OL) 5 for focusing a laser beam onto the disc 14, a quadrant photodetector 6 for generating an RF read signal 17 and astigmatic focus error signals 27, and two photo diodes (7A,7B) for generating tracking error signals (28A,28B).

A FES generator 29, responsive to the focus error signals 27 from the quadrant photodetector 6, generates a focus error signal 30 applied to a sliding mode controller 31 which generates a motor control signal 32 applied to the OL VCMs (10A, 10B). As described above, the RF read signal is computed as (A+B+C+D) and the focus error signal (FES) 30 is computed as (A+C)−(B+D). A TES generator 33, responsive to the tracking error signals (28A,28B), generates a centerline tracking error signal (TES) 34 which, as described above, is computed as (F−E).

Figure 1D:
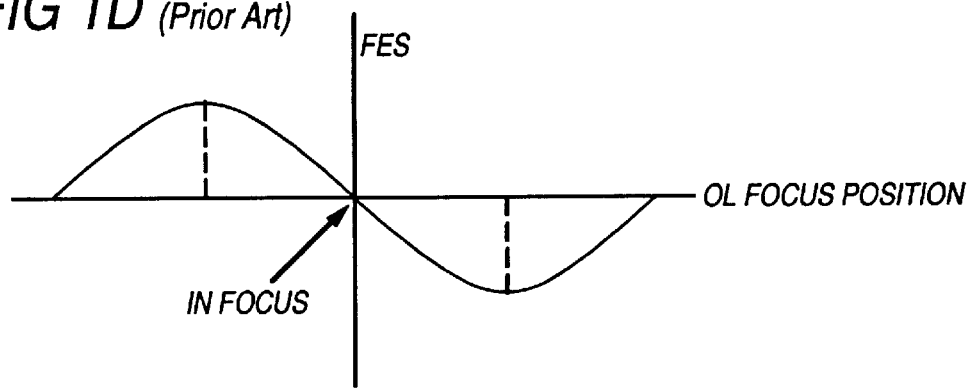
FIG. 1D is a plot of the focus error signal (FES) versus the position of the objective lens relative to the disc's surface.
Figure 1E:
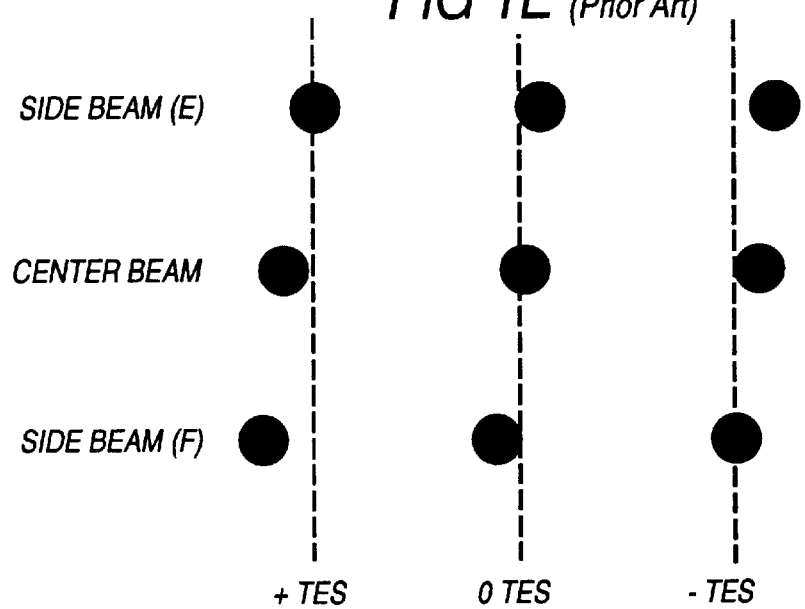
FIG. 1E shows various tracking conditions which can exist for the three beam system.
Figure 1F:
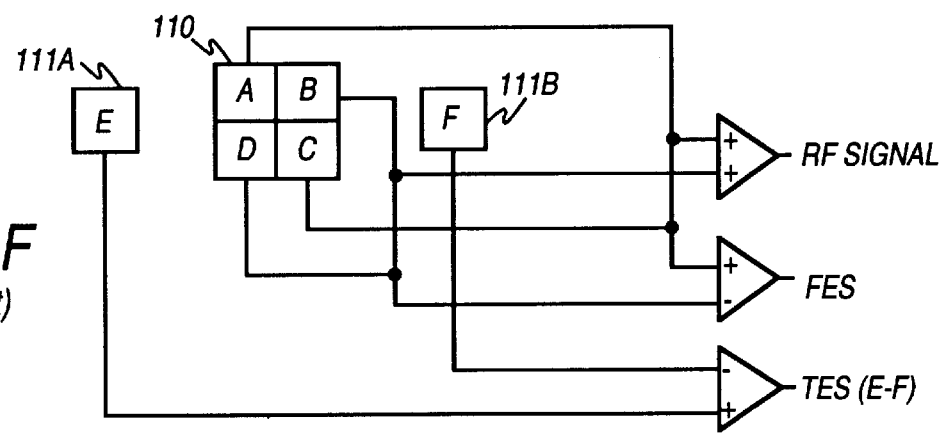
FIG. 1F illustrates how a three beam system generates the centerline tracking error signal (TES).
Figure 1G:
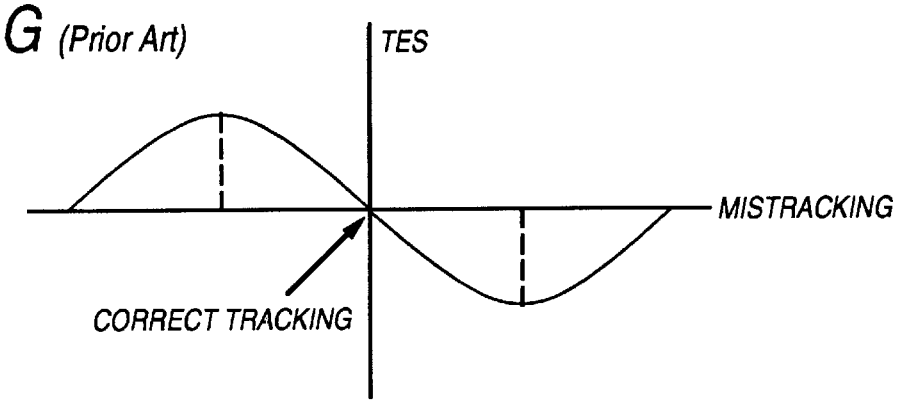
FIG. 1G is a plot of the tracking error signal (TES) versus the mistracking position of the objective lens relative to the centerline of a selected track.

To capture the initial focus position, the sliding mode controller 31 is de-activated (i.e., the focus servo loop is opened) and the OL VCMs (10A,10B) move the OL carriage unit 11 away from the disc 14 until it is out of focus. Then, with the loop still open, the OL VCMs (10A,10B) slowly move the OL 5 toward the disc until the FES 30 indicates that the OL 5 is within its pull-in range as defined by the linear region of FIG. 1D. The focus servo loop is then closed, and the sliding mode controller 31 begins tracking the in-focus position.

For fine seeking operations, where the seek distance is less than 200 tracks, the OL carriage unit 11 can perform the entire seek without having to move the entire sled assembly 8. The track counter 16 and state estimator 19 operate the same as in a coarse seek operation, and the position error X1 35 is generated by subtracting the Est. POS 18B and the TES 34 from the reference position (Ref. POS) 20 at adder 36. A sliding mode controller 37, responsive to the position error X1 35, generates a motor control signal 26 applied to the OL VCMs (10A,10B) in order to rotate the OL carriage unit 11 in the direction of the selected track. At the end of a fine seek operation, the OL VCM control signal 26 is applied to the sled servo control system of FIG. 2A at adder 21, thereby moving the sled assembly 8 toward the selected track until the OL carriage unit 11 is again in its center position.

Theory of Operation

Figure 3A:
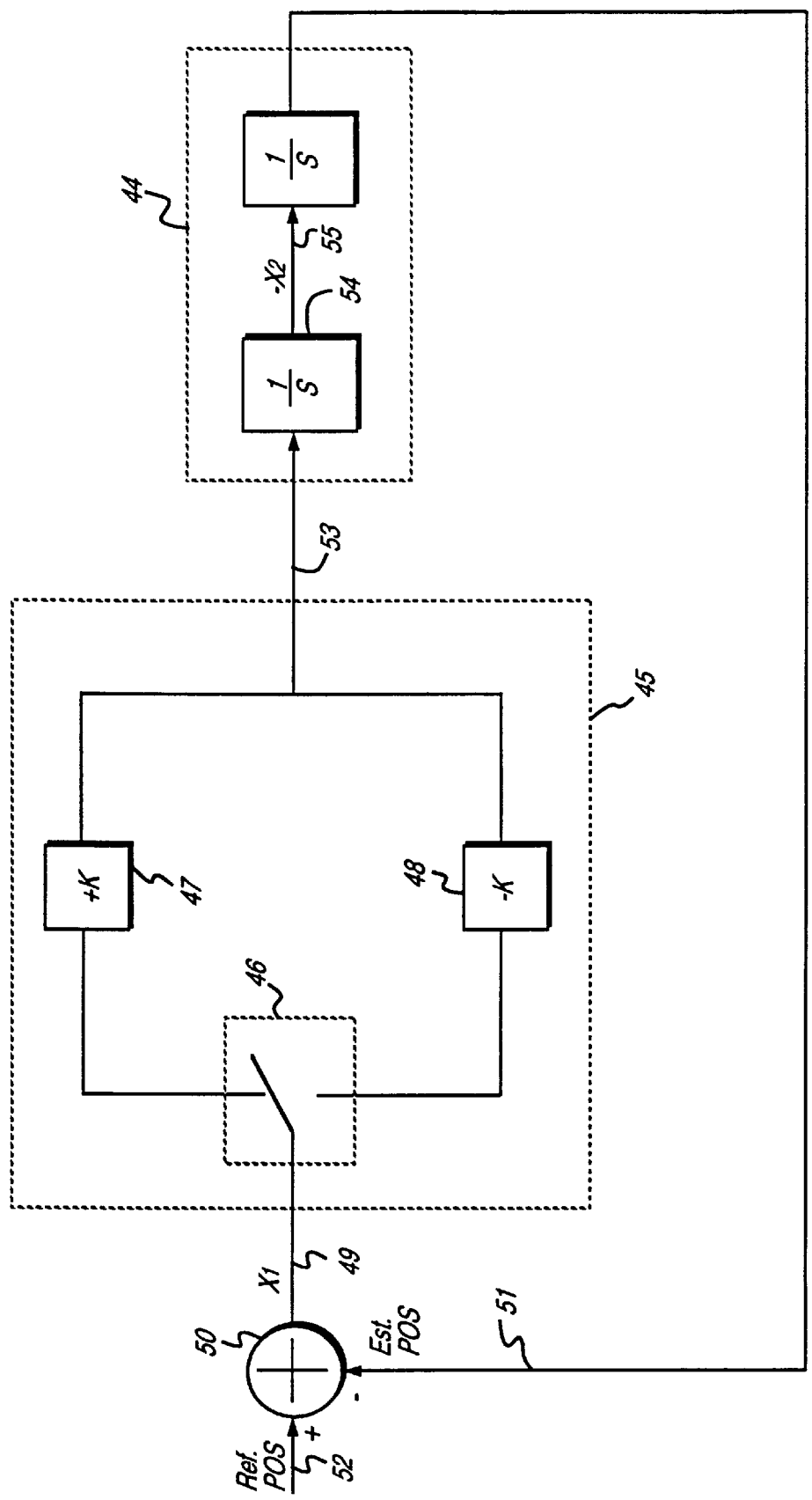
FIG. 3A is a block diagram of a second order system controlled by an example sliding mode controller.

Operation of a sliding mode controller is understood with reference to FIG. 3A. Shown is an example second order system 44 controlled by an example sliding mode controller 45 that switches 46 between a positive gain 47 and negative gain 48 not necessarily equal in magnitude. A position error X1 49 is generated at the output of adder 50 by subtracting an estimated position 51 of the controlled system from a desired position reference position 52. The position error X1 49 is multiplied by the positive gain 47 or the negative gain 48 depending on the state of switch 46 to generate an acceleration command 53 as the input to the controlled system 44. The output of integrator 54 is the velocity of the controlled system 44 which is also the negative of the position error velocity $-X2$ 55. When switch 46 selects the positive gain 47, it is a negative feedback system, and when switch 46 selects the negative gain 48, it is a positive feedback system. In their individual structures the system is unstable. However, the system can be made stable by repeatedly switching between the two structures.

The state space equation in negative feedback is:

$$\frac{dX_1}{dt} = X_2 \tag{1}$$

$$\frac{dX_2}{dt} = -KX_1$$

The general solution to equation (1) is:

$$X_1 = A\sin(Kt + \phi) \tag{2}$$

$$X_2 = \sqrt{K}\,A\cos(Kt + \phi) \tag{3}$$

Combining equations (2) and (3), $$\frac{X_1^2}{A^2} + \frac{X_2^2}{KA^2} = 1 \tag{4}$$

Figure 3B:
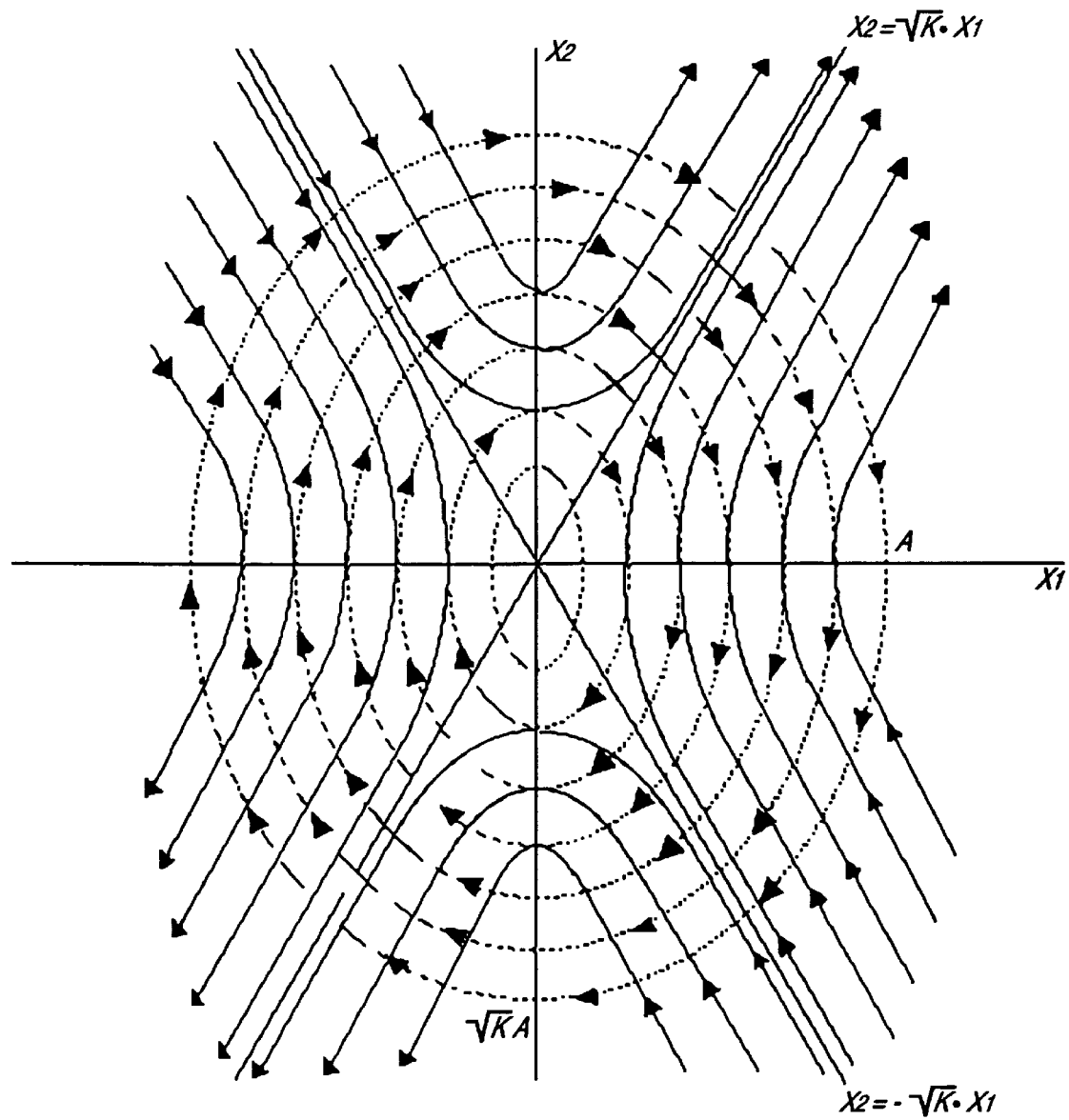
FIG. 3B are the phase plane plots for the position error and error velocity phase states for the positive and negative feedback modes of the control system shown in FIG. 3A.

The phase plane plot of equation (4) is a set of ellipses with eccentricities A and $\overline{K}A$ as illustrated in FIG. 3B.

The state space equation in positive feedback is:

$$\frac{dX_1}{dt} = X_2 \tag{5}$$

$$\frac{dX_2}{dt} = +KX_1.$$

The solution to equation (5) is:

$$X_1 = B_1 e^{\sqrt{K}\,t} + B_2 e^{-\sqrt{K}\,t} \tag{6}$$

$$X_2 = \sqrt{K}\,B_1 e^{\sqrt{K}\,t} - KB_2 e^{-\sqrt{K}\,t}$$

Combining equations (5) and (6), $$\frac{X_1^2}{4B_1B_2} - \frac{X_2^2}{4KB_1B_2} = 1 \tag{7}$$

The phase plane plot of equation (7) is a set of hyperbolas with two asymptotes as shown in FIG. 3B.

The two individual phase plane trajectories of equations (4) and (7) result in an unstable system since the phase states never reach the origin. It is possible, however, to reach the origin by driving the phase states along a third phase trajectory defined at the intersection of the negative and positive feedback trajectories. This is achieved by switching between the positive and negative gains in response to the current phase state values so that the phase states follow the predetermined third phase trajectory.

Figure 3C:
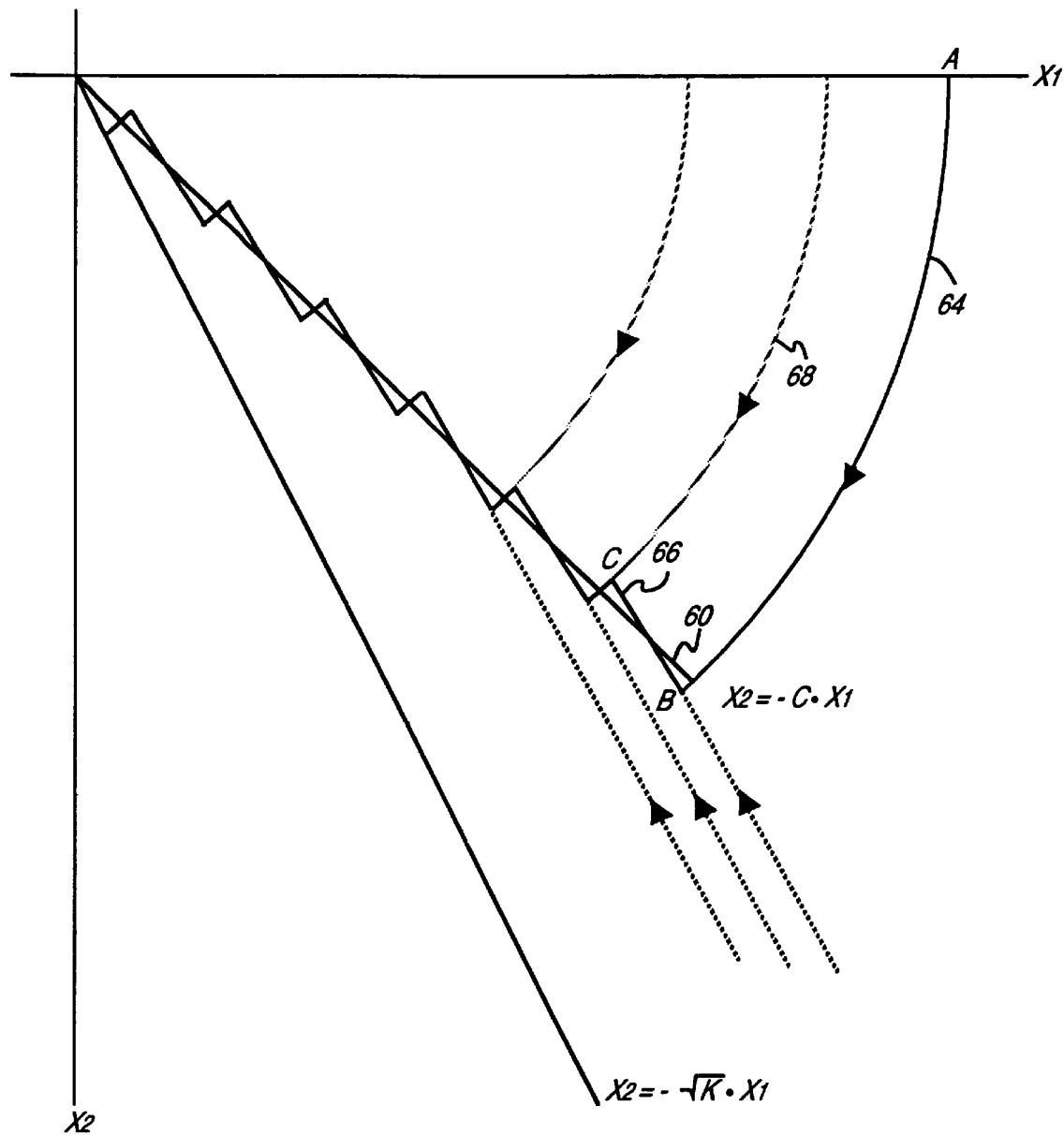
FIG. 3C illustrates the operation of the sliding mode controller in driving the phase states toward a predetermine linear phase trajectory during a forward seek to a new track.

The switching operation is understood with reference to FIG. 3C where the predetermined third phase trajectory is shown as a linear segment 60. When a new track is selected, the initial head position error is at point A, and the control system is initially switched to select the positive gain (i.e., negative feedback). As the head begins to accelerate toward the selected track, the phase states follow the arc trajectory 64 of the negative feedback mode. When the phase states reach the beginning of the third phase trajectory 60 at the intersection point B, the sliding mode controller switches to the negative gain and the phase states begin to follow the hyperbola trajectory 66 of the positive feedback mode. When the phase states cross the third phase trajectory 60 at point C, the controller switches back to the positive gain to drive the phase states along arc 68 back toward the third phase trajectory 60. This switching action is repeated so that the phase states slide along the linear segment 60 toward the origin of the phase plane. When the phase states are within a predetermined minimum distance from the origin of the phase plane, the system switches to a tracking mode where the sliding mode controller repeatedly switches between positive and negative feedback in order to keep the phase states near the origin of the phase plane, thereby keeping the read head 8 aligned over the centerline of the selected track.

The time domain response of the control system when the phase states follow the sliding line of FIG. 3C is:

$$X1(t) = X1(t1)e^{-C(t-t1)} \tag{8}$$

where t1 is the time when the phase states reach the sliding line at point B. Equation (8) is the average response of the system along the sliding line and it is substantially unaffected by variations in the parameter K or by external load disturbances. Consequently, it is not necessary to know the exact parameters of the system in order to determine the value for K. Equation (8), together with the existence Equation (11) below, prove that the system is globally stable within the sliding mode region.

The sliding mode controller determines when to switch between the positive and negative gains by observing the phase state values. The linear phase trajectory of FIG. 3C is defined by:

$$X2 = -C \cdot X1 \qquad (9)$$

where the constant C is the slope of the linear segment 60. By observing the phase states, the sliding mode controller switches the gains so that:

$$\sigma = X2 + C \cdot X1 = 0. \qquad (10)$$

The sliding mode controller switches to the positive gain when $\sigma \cdot X1 > 0$ and to the negative gain when $\sigma \cdot X1 < 0$ in order to drive the phase states toward the linear trajectory.

The overall response of the system is made faster by increasing the slope of the sliding line (i.e., increasing C). However, an important limitation in sliding mode control is that the third phase trajectory must be constrained to a region in the phase plane where the positive and negative feedback phase trajectories intersect in opposite directions. From FIG. 3C it follows that the slope of the sliding line must be constrained to $0 < C < \overline{K}$. A further relationship derived from this constraint is:

$$\lim_{\sigma \to 0} \sigma \cdot \frac{d\sigma}{dt} < 0. \qquad (11)$$

Equation (11) is known as the existence equation and it is used to determine values for the positive and negative gains.

Figure 3D:
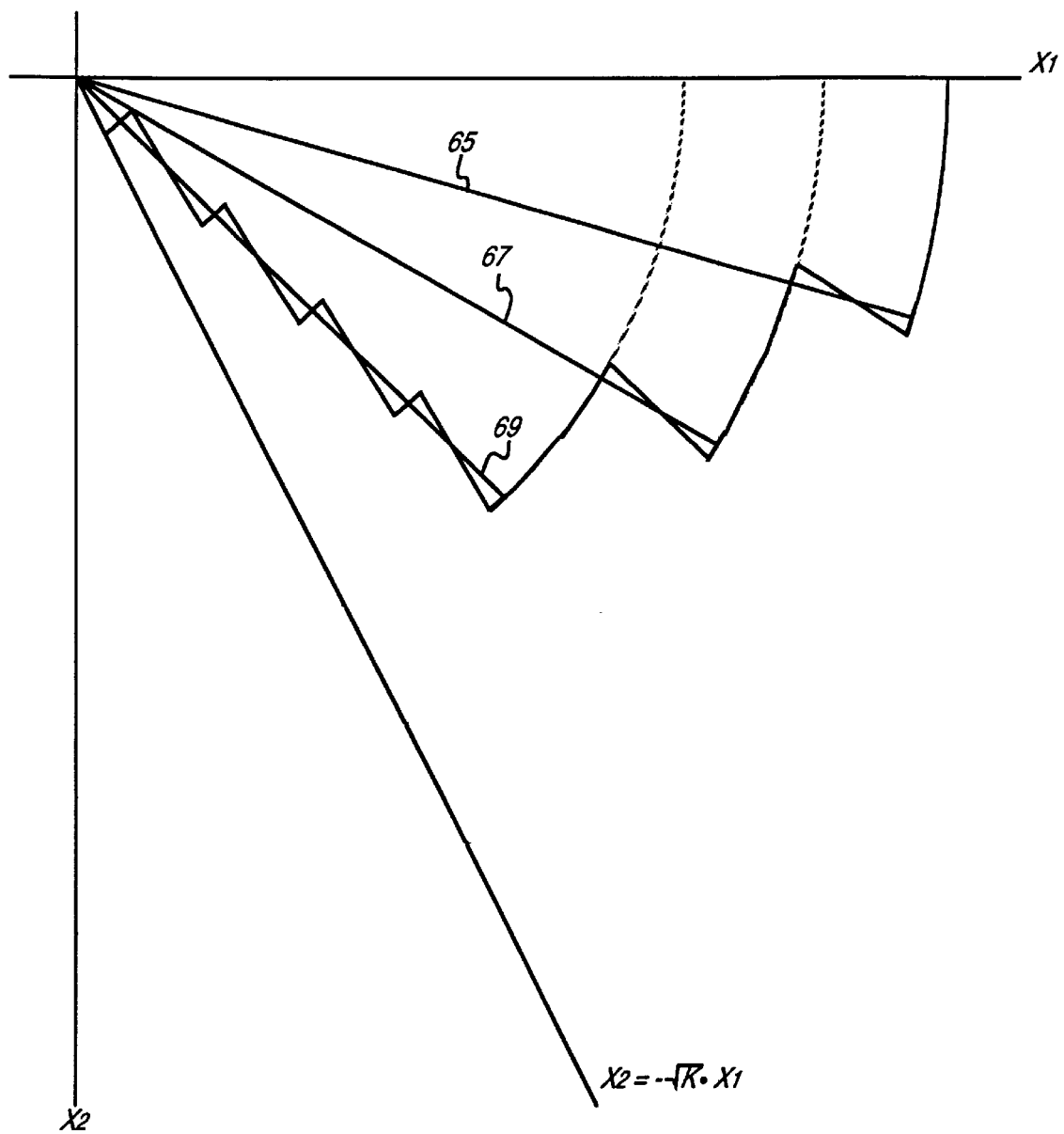
FIG. 3D illustrates the effect of changing the slope of the linear phase trajectory in FIG. 3C in order to extend the sliding mode.

The linear sliding mode trajectory 60 of FIG. 3C has the disadvantage in that it initially operates in a linear feedback mode, and the initial arc trajectory 64 may drift due to parameter variation and external load disturbance. This problem is reduced by extending the sliding mode region of operation. For instance, a phase trajectory adjustor can continuously adjust the slope of the linear segment as shown in FIG. 3D. After the phase states reach the first sliding line 65 and follow it for a predetermined amount of time, the phase trajectory adjustor increases the slope to sliding line 67 by increasing the constant C. The system operates in a linear mode (non-sliding mode) only during the inter-segment transitions. Eventually, the slope is increased to a predetermine maximum at sliding line 69 at which point the phase states slide along line 69 toward the origin of the phase plane.

Figure 3E:
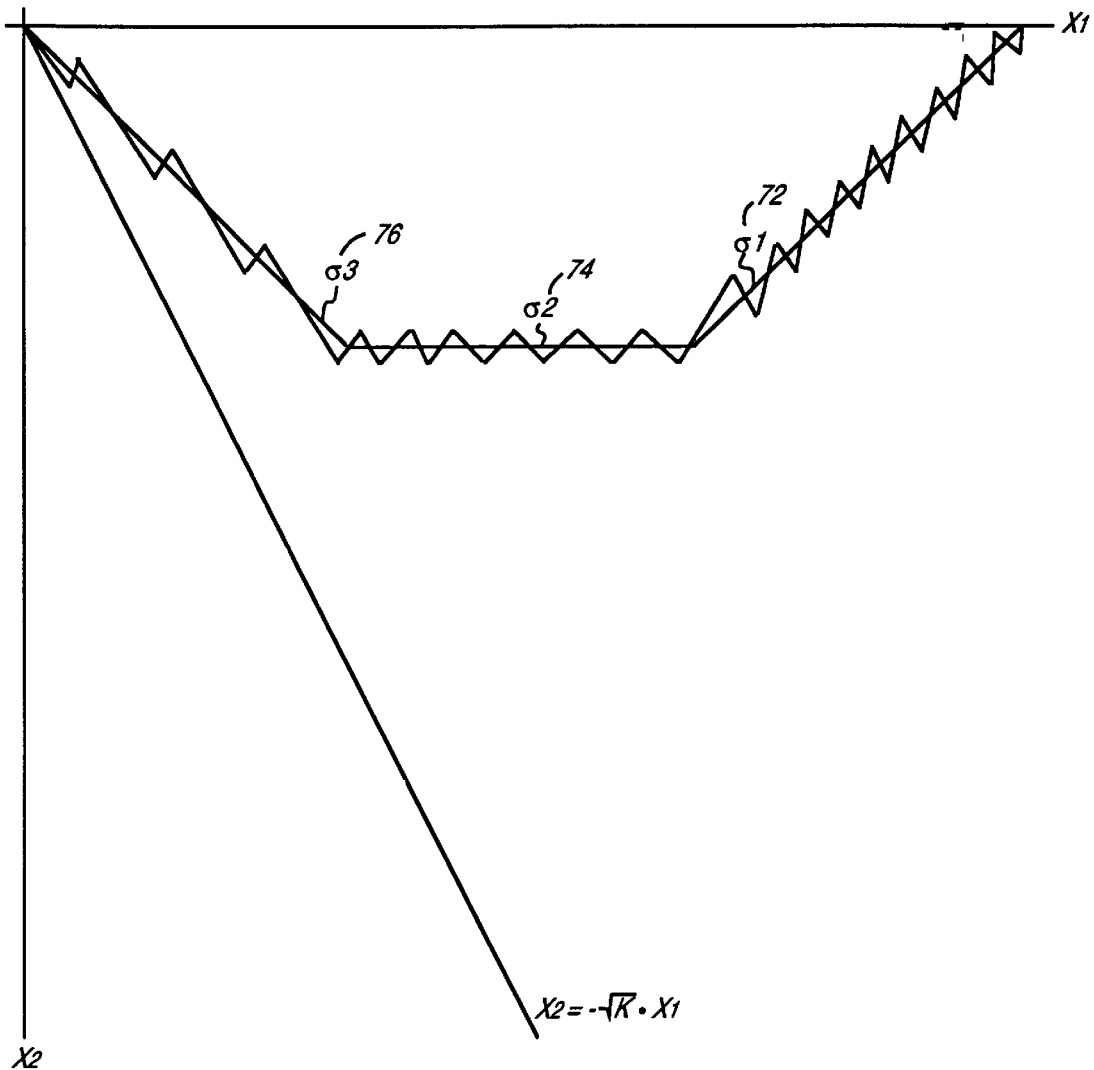
FIG. 3E illustrates a phase plane trajectory which covers the whole region of excursion thereby eliminating any linear mode of operation that may be sensitive to parameter variations.

A more robust implementation is to define a phase trajectory to cover the entire region of excursion. This is illustrated in FIG. 3E where the phase trajectory is comprised of three linear segments σ1 72, σ2 74, and σ3 76:

$$\sigma 1 = X2 - C1 \cdot (X1 - XI);$$

$$\sigma 2 = X2 - X2I; \text{ and}$$

$$\sigma 3 = X2 + C2 \cdot X1; \text{ where:}$$

X1=the actuator position error phase state;
X2=the actuator position error velocity phase state;
C1=the slope of the first segment;
C2=the slope of the third segment;
XI=an initial actuator position error; and
X2I=a predetermined constant position error velocity.

The first linear segment σoi 72 represents an acceleration of the actuator 8, the second linear segment σ2 74 represents a constant velocity of the actuator 8, and the third segment σ3 76 represents a deceleration of the actuator 8 toward the selected track.

As described above, C2 is constrained to $0 < C2 < \overline{k}$, but all three segments are also constrained by the maximum acceleration, constant velocity, and deceleration limits of the actuator. Once the phase trajectory is selected to be within the physical limitations of the actuator, the controller operates substantially independent of parameter variations and external load disturbances.

Figure 4:
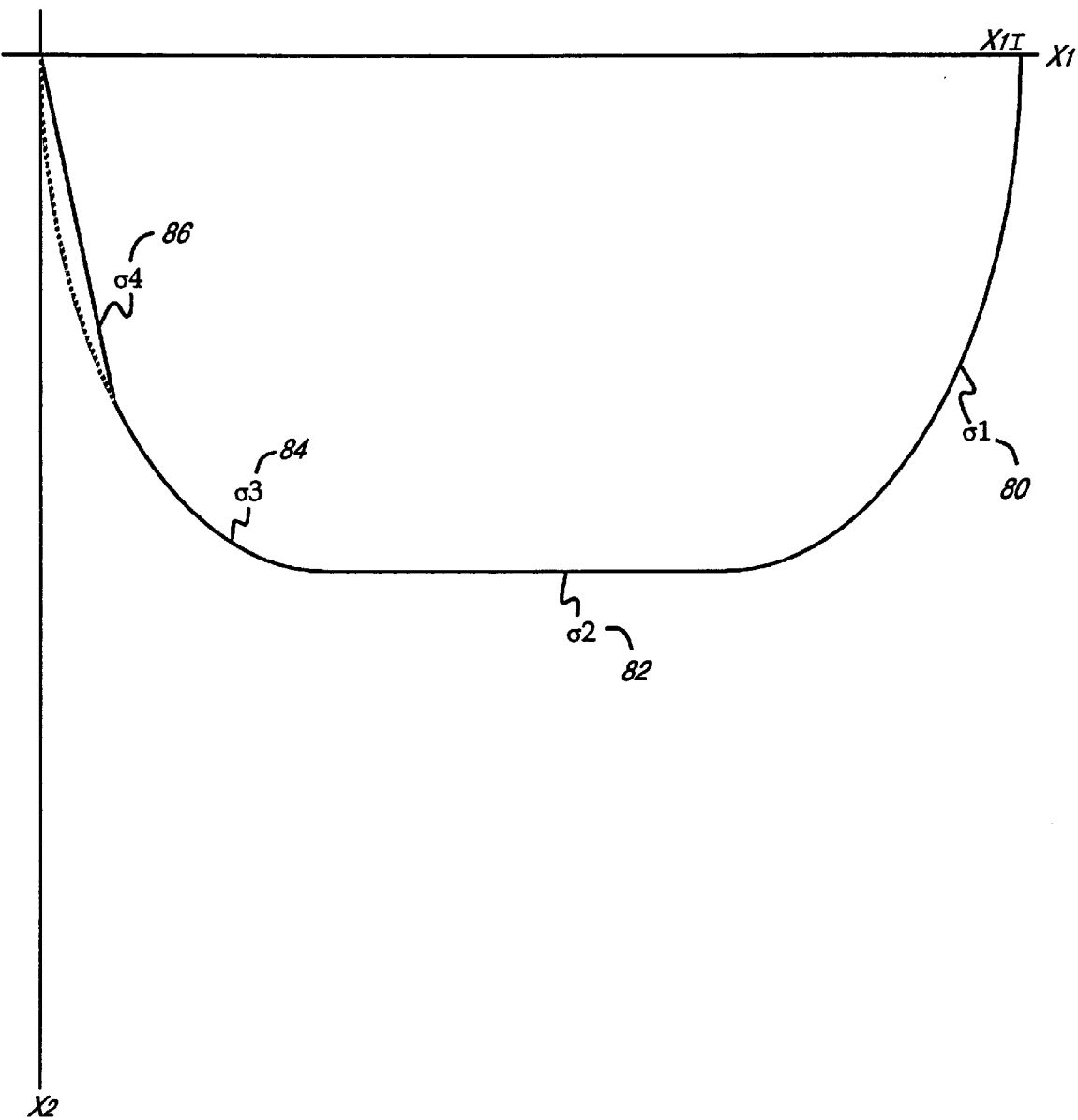
FIG. 4 illustrates the preferred phase plane trajectory of the present invention.
Figure 1:
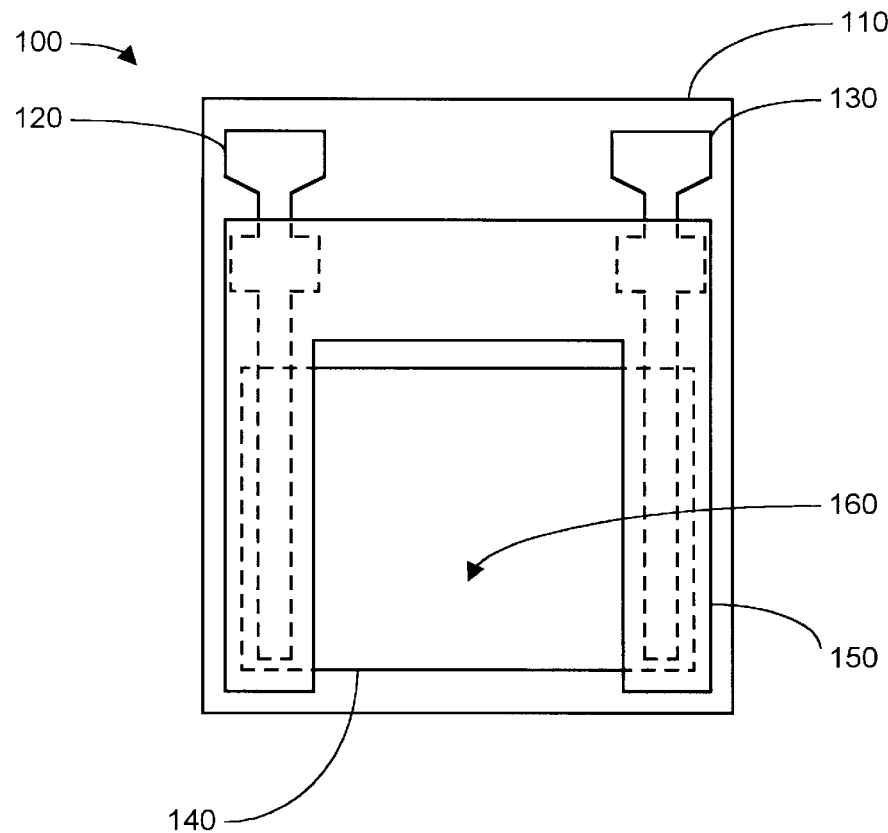
Figure 2:
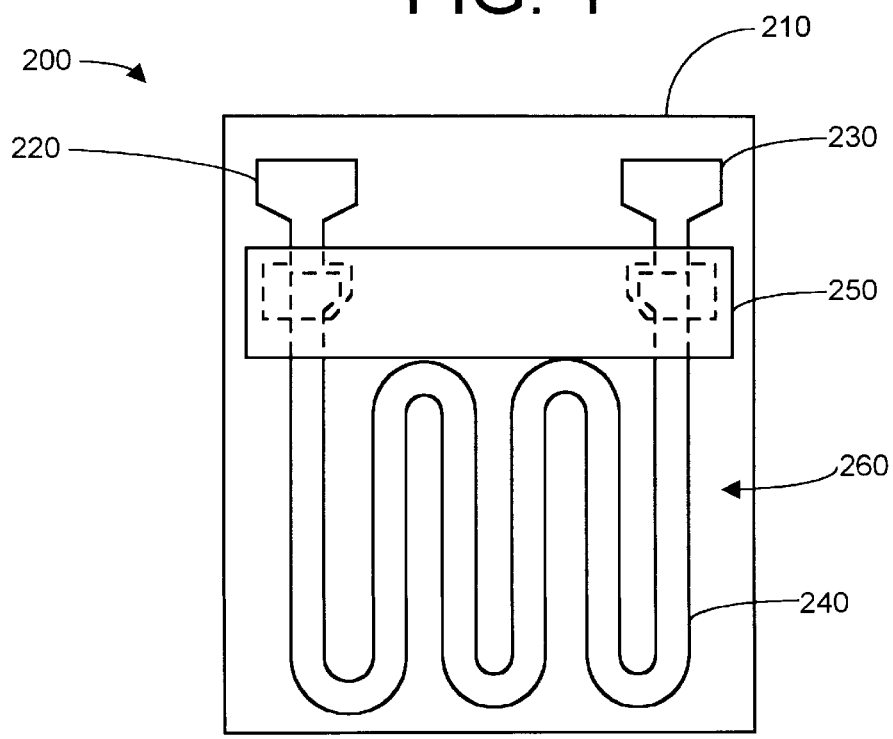

The optimum phase plane trajectory, and the preferred embodiment of the present invention, is illustrated in FIG. 4. This trajectory comprises a substantially parabolic acceleration segment (σ1 80, a linear constant velocity segment σ2 82, a second substantially parabolic deceleration segment (σ3 84, and a linear deceleration segment σ4 86:

$$\sigma 1 = C1 \cdot X2^2 + X1 - X1I; \qquad (13)$$

$$\sigma 2 = X2 - X2I; \qquad (14)$$

$$\sigma 3 = -C2 \cdot X2^2 + X1; \qquad (15)$$

$$\sigma 4 = X2 + C3 \cdot X1; \text{ where:} \qquad (16)$$

X1=the actuator position error phase state;
X2=the actuator position error velocity phase state;
C1=a predetermined acceleration constant;
X1I=an initial actuator position error;
X2I=a predetermined constant position error velocity;
C2=a predetermined deceleration constant; and
C3=a predetermined slope of the linear deceleration segment. The linear deceleration segment σ4 86 is necessary because the slope of the parabolic deceleration segment σ3 84 becomes too steep near the origin to support sliding mode (i.e., the deceleration becomes too large). The linear constant velocity segment σ2 82 is not necessary if the inter-track seek distance is sufficiently short (i.e., the phase states will transition from σ1 directly to σ3 if the initial position error is less than a predetermined threshold).

FIG. 5 shows the optical disc servo control systems modeled as second order plants. The output of the sliding mode controller U 60 is amplified 62 and input into the DCM 15 or VCMs (10A,10B) for actuating the lead screw 9 or OL carriage unit 11, respectively. The parameters of the DCM/VCM are:

Kt=Torque Constant;
Kv=Coefficient of Viscous Damping;
Ks=Coefficient of Coulomb Friction; and
J=Inertia.

The position error phase state X1 66 is observed at the output of adder 68, and the position error velocity phase state X2 is observed as the negative of the DCM/VCM velocity 92. Alternatively, the position error velocity phase state X2 can be generated by differentiating the position error signal X1 66 or generated by the state estimator 19. From FIG. 5, the phase state equations can be written as:

$$\frac{dX_1}{dt} = X_2; \text{ and} \qquad (17)$$

$$\frac{dX_2}{dt} = \frac{-K_v}{J} \cdot X_2 - \frac{K_s}{J} \cdot X_1 - \frac{K_t \cdot K_{pa}}{J} \cdot U$$

With $U = \pm K \cdot X1$, the phase state equations are similar to equations (1) and (5), and the phase plots are similar to those shown in FIG. 3B.

Although the position error X1 alone is sufficient to implement sliding mode, further control is attained when the position error velocity X2 is added to the feedback loop. In fact, the disc drive control system of the present invention operates optimum with the position error velocity X2 as the only control signal during a seek since the position error X1 is initially much larger than the position error velocity X2. Removing the position error X1 from the feedback loop during seeks reduces the amount of switching noise. When the phase states reach a predetermined point on the phase trajectory, the system switches the position error X1 phase state back into the control loop.

Hardware Description

Figure 6:
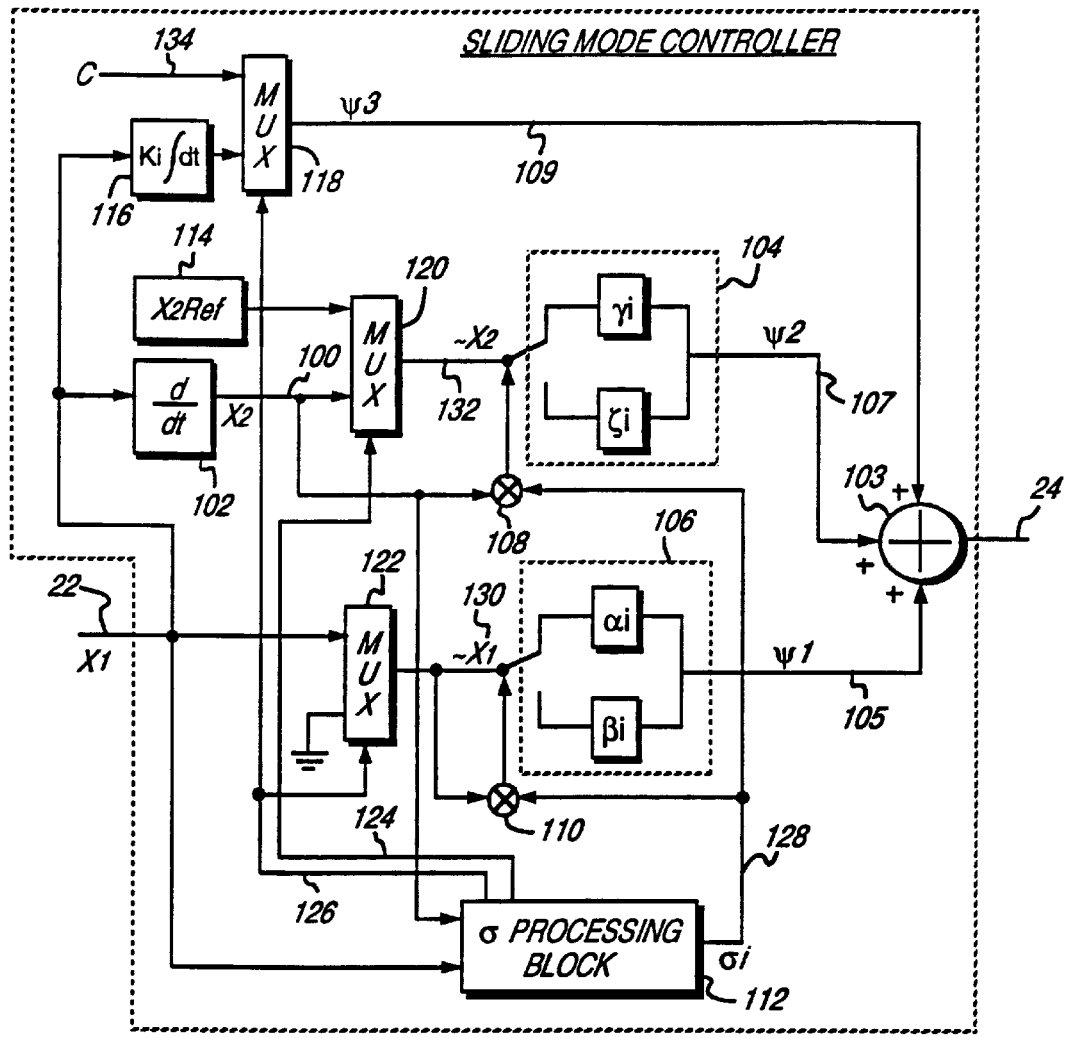
FIG. 6 is a detailed diagram of the disc drive control system of the present invention wherein the sliding mode controller is responsive to a position error and a position error velocity phase state.

FIG. 6 shows one embodiment for the sliding mode controllers of the present invention. The position error X1 22 is input into the sliding mode controller, and a differentiator 102 differentiates the position error X1 22 to generate the position error velocity signal X2 100. In an alternative embodiment not shown, the state estimator 19 generates the position error velocity X2 100. Two switching gain circuits 104 and 106 multiply the position error ~X1 130 and error velocity ~X2 132 control signals, respectively. Multipliers 108 and 110, responsive to the phase states ~X1 and X2 and the current trajectory segment $\sigma i$, control the switching operation of the gain circuits. The sign of the resulting multiplication determines the state of the switch so as to drive the phase states X1 and X2 toward the predetermined sliding line trajectory shown in FIG. 4. A $\sigma$ processing block 112, responsive to the phase states X1 and X2, implements the trajectory segment switching logic to determine which segment $\sigma i$ of the phase trajectory the phase states are to follow. The operation of the $\sigma$ processing block 112, the integrator 116, the reference error velocity generator 114, and multiplexors 118, 120, and 122, are discussed in detail bellow.

The gain values $\alpha i$, $\beta i$, $\gamma i$ and $\zeta i$ in switching gain blocks 104 and 106 are programmably set to appropriate values according to the current trajectory segment being followed by the phase states. Also, the gain values are programmed to predetermined values depending on whether the controller is executing a forward or reverse seek. Using the existence equation (11) and the phase trajectory equations (13), (14), (15) and (16), appropriate constraints for the gain values for each segment of the phase trajectory shown in FIG. 4 can now be computed to ensure sliding mode.

For $\sigma=\sigma 1$ (seek accelerate), differentiating equation (13) with respect to time and multiplying by equation (13) obtains:

$$\sigma_1 \cdot \frac{d\sigma_1}{dt} = \sigma_1 \cdot \left[ 2 \cdot \sigma_1 \cdot X_2 \cdot \frac{dX2}{dt} \right] + \sigma_1 \cdot X2.$$

From equation (17) and factoring $\sigma 1 \cdot X2$ obtains:

$$\sigma_1 \cdot \frac{d\sigma_1}{dt} = \sigma_1 \cdot \left[ 2 \cdot C_1 \cdot X_2 \cdot \left[ \frac{-K_v}{J} \cdot X_2 - \frac{K_t \cdot K_{pa}}{J} + \frac{1}{2 \cdot C_1} \right] \right]. \quad (18)$$

From FIGS. 5 and 6, and ignoring the $\psi 3$ term as insignificantly small during seeking:

$$U = \psi_1 \cdot X_1 + \psi_2 \cdot X_2 \quad (19)$$

where:

$$\psi_1 = \begin{cases} \alpha_i & \text{if } \sigma_i \cdot X_1 > 0 \\ \beta_i & \text{if } \sigma_i \cdot X_1 < 0 \end{cases} \quad (20)$$

$$\psi_2 = \begin{cases} \gamma_i & \text{if } \sigma_i \cdot X_2 > 0 \\ \zeta_i & \text{if } \sigma_i \cdot X_2 < 0 \end{cases} \quad (21)$$

From equations (18) and (19), and ignoring term $$\frac{1}{2 \cdot C1}$$

as insignificantly small:

$$\sigma_1 \cdot \frac{d\sigma_1}{dt} = \quad (22)$$

$$2 \cdot C_1 \cdot X_2 \cdot \sigma_1 \cdot \left[ \frac{-K_v}{J} \cdot X_2 - \frac{K_t \cdot K_{pa}}{J} \cdot (\psi_1 \cdot X_1 + \psi_2 \cdot X_2) \right]$$

$$\sigma_1 \cdot \frac{d\sigma_1}{dt} =$$

$$2 \cdot C_1 \cdot X_2 \cdot \left[ \left[ \frac{-K_v}{J} - \frac{K_t \cdot K_{pa}}{J} \cdot \psi_2 \right] \sigma_1 \cdot X_2 - \left[ \frac{K_t \cdot K_{pa}}{J} \cdot \psi_1 \right] \cdot \sigma_1 \cdot X_1 \right]$$

In order to satisfy existence equation (11) (i.e., equation (22) is negative for any X1 and X2), the gain constants must satisfy the following inequalities:

if reverse seeking ($X_2 > 0$) then
{ if ($\sigma_1 \cdot X_1 > 0$) from equation (20)

$\psi_1 = \alpha_1$ and for $\frac{K_t \cdot K_{pa} \cdot \alpha_1}{J} > 0 \quad \Rightarrow \alpha_1 > 0$ else if ($\sigma_1 \cdot X_1 < 0$) from equation (20)

$\psi_1 = \beta_1$ and for $\frac{K_t \cdot K_{pa} \cdot \beta_1}{J} < 0 \quad \Rightarrow \beta_1 < 0$ if ($\sigma_1 \cdot X_2 > 0$) from equation (21)

$\psi_2 = \gamma_1$ and for $\left[ -\frac{K_v}{J} - \frac{K_t \cdot K_{pa} \cdot \gamma_1}{J} \right] < 0 \quad \Rightarrow \gamma_1 > -\frac{K_v}{K_t \cdot K_{pa}}$ else if ($\sigma_1 \cdot X_2 < 0$) from equation (21)

$\psi_2 = \zeta_1$ and for $\left[ -\frac{K_v}{J} - \frac{K_t \cdot K_{pa} \cdot \zeta_1}{J} \right] > 0 \quad \Rightarrow \zeta_1 < -\frac{K_v}{K_t \cdot K_{pa}}$

} else if forward seeking ($X_2 < 0$) then
{ if ($\sigma_1 \cdot X_1 > 0$) from equation (20)

$\psi_1 = \alpha_1$ and for $\frac{K_t \cdot K_{pa} \cdot \alpha_1}{J} < 0 \quad \Rightarrow \alpha_1 < 0$ else if ($\sigma_1 \cdot X_1 < 0$) from equation (20)

$\psi_1 = \beta_1$ and for $\frac{K_t \cdot K_{pa} \cdot \beta_1}{J} > 0 \quad \Rightarrow \beta_1 > 0$ if ($\sigma_1 \cdot X_2 > 0$) from equation (21)

$\psi_2 = \gamma_1$ and for $\left[ -\frac{K_v}{J} - \frac{K_t \cdot K_{pa} \cdot \gamma_1}{J} \right] > 0 \quad \Rightarrow \gamma_1 < -\frac{K_v}{K_t \cdot K_{pa}}$ -continued else if $(\sigma_1 \cdot X_2 < 0)$ from equation (21)

$$\psi_2 = \zeta_1 \text{ and for } \left[ -\frac{K_v}{J} - \frac{K_t \cdot K_{pa} \cdot \zeta_1}{J} \right] < 0 \Rightarrow \zeta_1 > -\frac{K_v}{K_t \cdot K_{pa}}$$

}

For $\sigma = \sigma 2$ (seek at constant velocity), differentiating equation (14) with respect to time and multiplying by equation (14) obtains:

$$\sigma_2 \cdot \frac{d\sigma_2}{dt} = \sigma_2 \cdot \frac{dX_2}{dt}$$

From equation (17):

$$\sigma_2 \cdot \frac{d\sigma_2}{dt} = \sigma_2 \cdot \left[ -\frac{K_v}{J} \cdot X_2 - \frac{K_t \cdot K_{pa}}{J} \cdot U \right].$$

From equation (19):

$$\sigma_2 \cdot \frac{d\sigma_2}{dt} = \sigma_2 \cdot \left[ -\frac{K_v}{J} \cdot X_2 - \frac{K_t \cdot K_{pa}}{J} \cdot (\psi_1 \cdot X_1 + \psi_2 \cdot X_2) \right] \quad (23)$$

$$\sigma_2 \cdot \frac{d\sigma_2}{dt} =$$

$$\sigma_2 \cdot \left[ -\frac{K_v}{J} \cdot X_2 - \frac{K_t \cdot K_{pa}}{J} \cdot \psi_2 \right] \sigma_2 \cdot X_2 - \left[ \frac{K_t \cdot K_{pa}}{J} \cdot \psi_1 \right] \sigma_2 \cdot X_1.$$

In order to satisfy existence equation (11) (i.e., equation (23) is negative for any X1 and X2), the gain constants must satisfy the following inequalities:

if $(\sigma_2 \cdot X_1 > 0)$ from equation (20)

$$\psi_1 = \alpha_2 \text{ and for } \frac{K_t \cdot K_{pa} \cdot \alpha_2}{J} > 0 \Rightarrow \alpha_2 > 0$$

else if $(\sigma_1 \cdot X_1 < 0)$ from equation (20)

$$\psi_1 = \beta_2 \text{ and for } \frac{K_t \cdot K_{pa} \cdot \beta_2}{J} < 0 \Rightarrow \beta_2 < 0$$

if $(\sigma_2 \cdot X_2 > 0)$ from equation (21)

$$\psi_2 = \gamma_2 \text{ and for } \left[ -\frac{K_v}{J} - \frac{K_t \cdot K_{pa} \cdot \gamma_2}{J} \right] < 0 \Rightarrow \gamma_2 > -\frac{K_v}{K_t \cdot K_{pa}}$$

else if $(\sigma_2 \cdot X_2 < 0)$ from equation (21)

$$\psi_2 = \zeta_2 \text{ and for } \left[ -\frac{K_v}{J} - \frac{K_t \cdot K_{pa} \cdot \zeta_2}{J} \right] > 0 \Rightarrow \zeta_2 < -\frac{K_v}{K_t \cdot K_{pa}}$$

For $\sigma = \sigma 3$ (seek decelerate), differentiating equation (15) with respect to time and multiplying by equation (15) obtains:

$$\sigma_3 \cdot \frac{d\sigma_3}{dt} = \sigma_3 \cdot \left[ -2 \cdot C_2 \cdot X_2 \cdot \frac{dX_2}{dt} \right] + \sigma_3 \cdot X_2.$$

From equation (17) and factoring $\sigma 1 \cdot X_2$ obtains:

$$\sigma_3 \cdot \frac{d\sigma_3}{dt} = \sigma_3 \cdot \left[ -2 \cdot C_2 \cdot X_2 \cdot \left[ -\frac{K_v}{J} \cdot X_2 - \frac{K_t \cdot K_{pa}}{J} \cdot U + \frac{1}{2 \cdot C_2} \right] \right]. \quad (24)$$

From equations (18) and (19), and ignoring term $$\frac{1}{2 \cdot C_2}$$

as insignificantly small:

$$\sigma_3 \cdot \frac{d\sigma_3}{dt} = \quad (25)$$

$$-2 \cdot C_2 \cdot X_2 \cdot \sigma_3 \cdot \left[ -\frac{K_v}{J} \cdot X_2 - \frac{K_t \cdot K_{pa}}{J} \cdot (\psi_1 \cdot X_1 + \psi_2 \cdot X_2) \right]$$

$$\sigma_3 \cdot \frac{d\sigma_3}{dt} = -2 \cdot C_2 \cdot$$

$$X_2 \cdot \left[ \left[ -\frac{K_v}{J} - \frac{K_t \cdot K_{pa}}{J} \cdot \psi_2 \right] \sigma_3 \cdot X_2 - \left[ \frac{K_t \cdot K_{pa}}{J} \cdot \psi_1 \right] \sigma_3 \cdot X_1 \right]$$

In order to satisfy existence equation (11) (i.e., equation (25) is negative for any X1 and X2), the gain constants must satisfy the following inequalities:

if reverse seeking $(X_2 > 0)$ then

{ if $(\sigma_3 \cdot X_1 > 0)$ from equation (20)

$$\psi_1 = \alpha_3 \text{ and for } \frac{K_t \cdot K_{pa} \cdot \alpha_3}{J} < 0 \Rightarrow \alpha_3 < 0$$

else if $(\sigma_3 \cdot X_1 < 0)$ from equation (20)

$$\psi_1 = \beta_3 \text{ and for } \frac{K_t \cdot K_{pa} \cdot \beta_3}{J} > 0 \Rightarrow \beta_3 > 0$$

if $(\sigma_3 \cdot X_2 > 0)$ from equation (21)

$$\psi_2 = \gamma_3 \text{ and for } \left[ -\frac{K_v}{J} - \frac{K_t \cdot K_{pa} \cdot \gamma_3}{J} \right] > 0 \Rightarrow \gamma_3 > -\frac{K_v}{K_t \cdot K_{pa}}$$

else if $(\sigma_3 \cdot X_2 < 0)$ from equation (21)

$$\psi_2 = \zeta_3 \text{ and for } \left[ -\frac{K_v}{J} - \frac{K_t \cdot K_{pa} \cdot \zeta_3}{J} \right] < 0 \Rightarrow \zeta_3 > -\frac{K_v}{K_t \cdot K_{pa}}$$

} else if forward seeking $(X_2 < 0)$ then

{ if $(\sigma_3 \cdot X_1 > 0)$ from equation (20)

$$\psi_1 = \alpha_3 \text{ and for } \frac{K_t \cdot K_{pa} \cdot \alpha_3}{J} > 0 \Rightarrow \alpha_3 > 0$$

else if $(\sigma_3 \cdot X_1 < 0)$ from equation (20)

$$\psi_1 = \beta_3 \text{ and for } \frac{K_t \cdot K_{pa} \cdot \beta_3}{J} < 0 \Rightarrow \beta_3 < 0$$

if $(\sigma_3 \cdot X_2 > 0)$ from equation (21)

$$\psi_2 = \gamma_3 \text{ and for } \left[ -\frac{K_v}{J} - \frac{K_t \cdot K_{pa} \cdot \gamma_3}{J} \right] < 0 \Rightarrow \gamma_3 < -\frac{K_v}{K_t \cdot K_{pa}}$$

else if $(\sigma_3 \cdot X_2 < 0)$ from equation (21)

$$\psi_2 = \zeta_3 \text{ and for } \left[ -\frac{K_v}{J} - \frac{K_t \cdot K_{pa} \cdot \zeta_3}{J} \right] > 0 \Rightarrow \zeta_3 < -\frac{K_v}{K_t \cdot K_{pa}}$$

}

For $\sigma = \sigma 4$ (tracking), differentiating equation (16) with respect to time and multiplying by equation (16) obtains:

$$\sigma_4 \cdot \frac{d\sigma_4}{dt} = \sigma_4 \cdot \frac{dX_2}{dt} + \sigma_4 \cdot C_3 \cdot \frac{dX_1}{dt}$$

From equation (17):

$$\sigma_4 \cdot \frac{d\sigma_4}{dt} = \sigma_4 \cdot \left[ -\frac{K_v}{J} \cdot X_2 - \frac{K_t \cdot K_{pa}}{J} \cdot U + C_3 \cdot X_2 \right].$$

From equation (19):

$$\sigma_4 \cdot \frac{d\sigma_4}{dt} = \sigma_4 \cdot \left[ -\frac{K_v}{J} \cdot X_2 - \frac{K_t \cdot K_{pa}}{J} \cdot (\psi_1 \cdot X_1 + \psi_2 \cdot X_2) + C_3 \cdot X_2 \right] \quad (26)$$

$$\sigma_4 \cdot \frac{d\sigma_4}{dt} = \left[ C_3 - \frac{K_v}{J} - \frac{K_t \cdot K_{pa}}{J} \cdot \psi_2 \right] \sigma_4 \cdot X_2 - \left[ \frac{K_t \cdot K_{pa}}{J} \cdot \psi_1 \right] \sigma_4 \cdot X_1.$$

In order to satisfy existence equation (11) (i.e., equation (26) is negative for any X1 and X2), the gain constants must satisfy the following inequalities:

if $(\sigma_4 \cdot X_1 > 0)$ from equation (20)

$$\psi_1 = \alpha_4 \text{ and for } \frac{K_t \cdot K_{pa} \cdot \alpha_4}{J} > 0 \quad \Rightarrow \alpha_4 > 0$$

else if $(\sigma_4 \cdot X_1 < 0)$ from equation (20)

$$\psi_1 = \beta_4 \text{ and for } \frac{K_t \cdot K_{pa} \cdot \beta_4}{J} < 0 \quad \Rightarrow \beta_4 < 0$$

if $(\sigma_4 \cdot X_2 > 0)$ from equation (21)

$$\psi_2 = \gamma_4 \text{ and for } \left[ C - \frac{K_v}{J} - \frac{K_t \cdot K_{pa} \cdot \gamma_4}{J} \right] < 0 \quad \Rightarrow \gamma_4 < \frac{C - K_v}{K_t \cdot K_{pa}}$$

else if $(\sigma_4 \cdot X_2 < 0)$ from equation (21)

$$\psi_2 = \zeta_4 \text{ and for } \left[ C - \frac{K_v}{J} - \frac{K_t \cdot K_{pa} \cdot \zeta_4}{J} \right] > 0 \quad \Rightarrow \zeta_4 < \frac{C - K_v}{K_t \cdot K_{pa}}$$

Flow Chart Description

Operation of the sliding mode controller shown in FIG. 6 will now be further explained in the context of a coarse seek operation with reference to FIG. 2A and centerline tracking with reference to FIG. 2B. It is noted, however, that the following description applies also to the focus servo loop; that is, flow charts of FIG. 7A, 7B, and 7C describe the operation of sliding mode controllers 23, 31 and 37 of FIG. 2A and FIG. 2B.

Figure 7A:
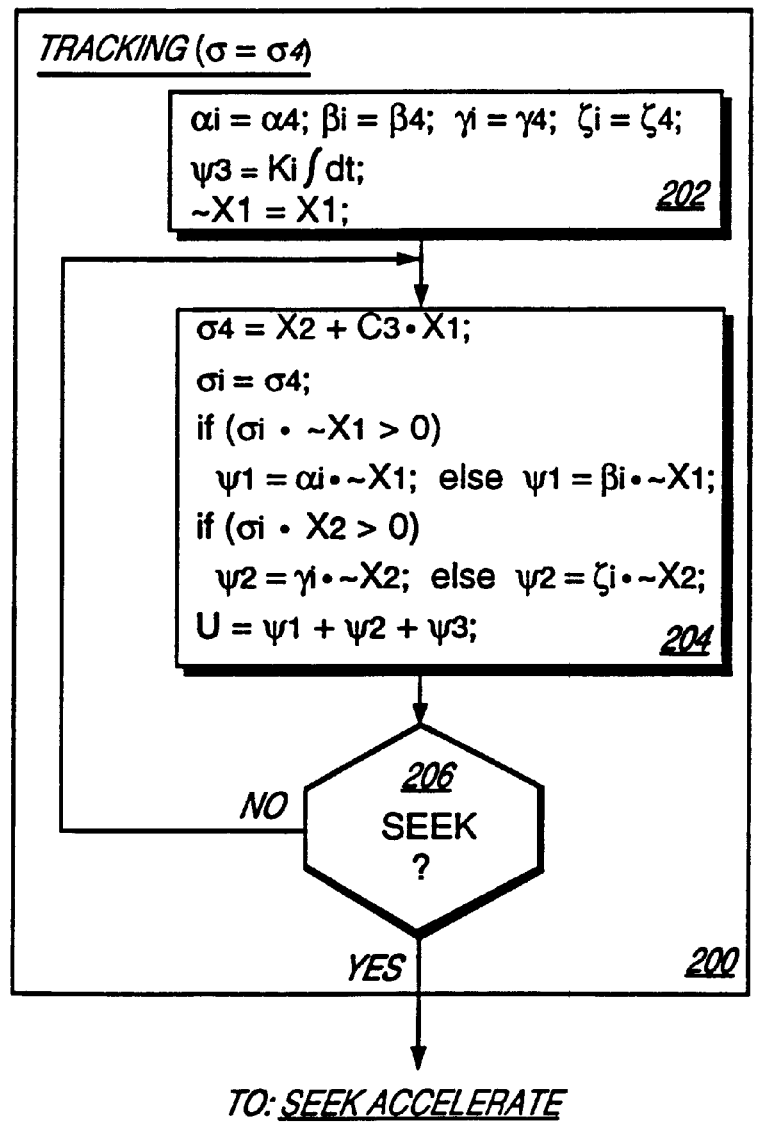
FIG. 7A, 7B, and 7C are flow charts that describe the operation of the sliding mode controller of FIG. 6.

Assuming the servo control system is initially in the tracking mode 200 of FIG. 7A, the read head 8 tracks 204 the currently selected track until a seek forward or seek reverse command is received. When a forward seek is initiated, SEEK? 206 is YES and the head reference position, Ref. POS 20, is updated to a newly selected track. The initial head position error X1 22 at the output of adder 21 of FIG. 2A is the difference between the current track 18B output from state estimator 19 and the newly selected track (i.e., Ref. POS 20). This initial position error is also shown in FIG. 4 as the beginning of trajectory segment σ=σ1 80 at X1r. Segment σ=σ1 80 is a parabolic trajectory that defines the desired acceleration of the read head 8 toward the selected track.

Figure 7B:
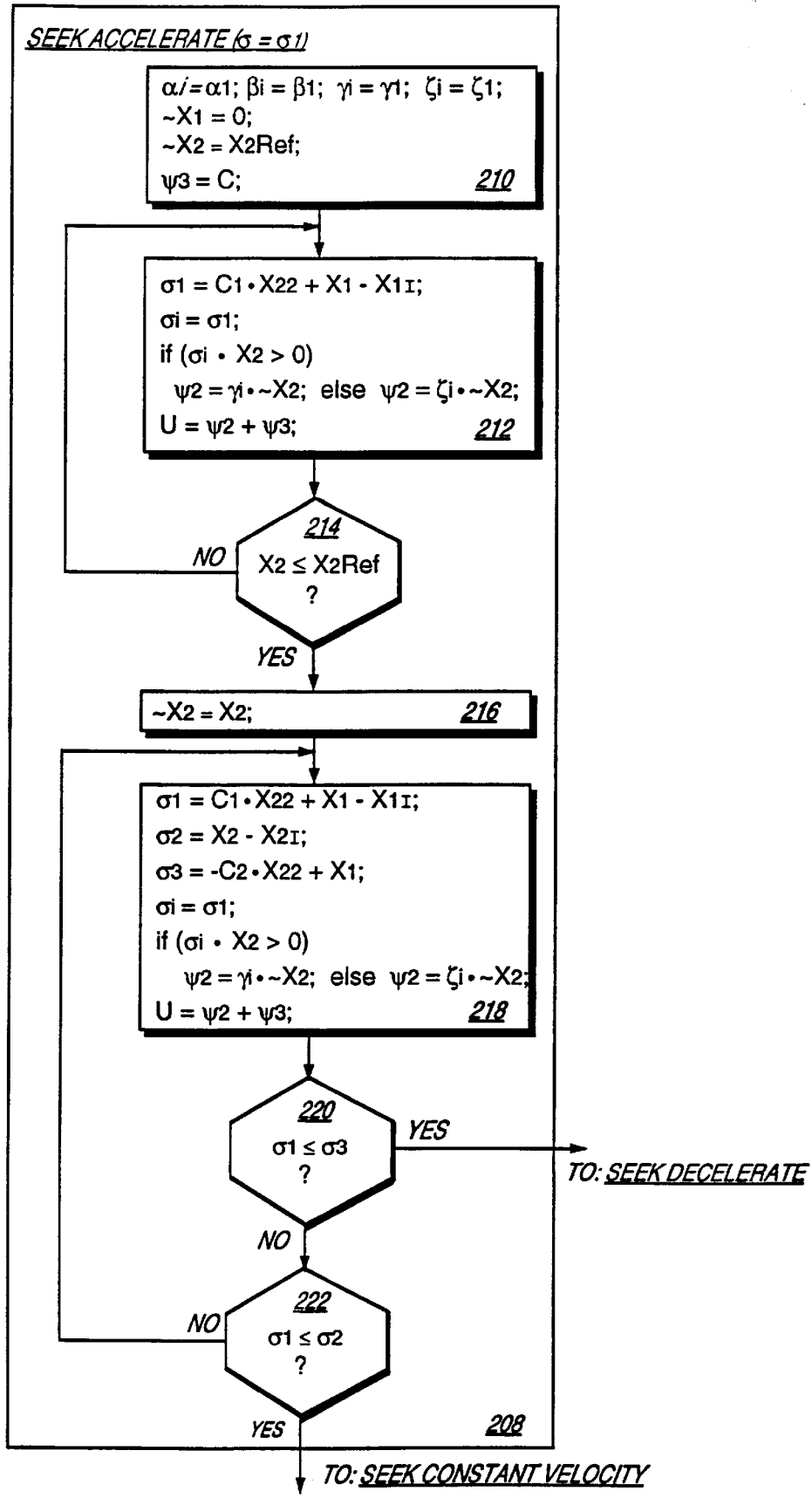

Referring now to FIG. 7B, at the beginning of SEEK ACCELERATE (σ=σ1) 208 the sliding mode controller 23 initializes various parameters 210. The gain constants in blocks 104 and 106 of FIG. 6 are updated to the values corresponding to the acceleration trajectory σ=σ1 80. In order to reduce switching noise during a seek operation, the position error phase state X1 22 is switched out of the sliding mode control. The σ processing block 112 selects, over line 126, the ground plane as the output of multiplexor 122. As a result, ~X1 130 is set to zero in order to disable the switching action of multiplier 110 and to remove the contribution of ψi from the computation of the motor command U 24 at the output of adder 103. Because the position error phase state ~X1 130 is disabled, the velocity phase state ~X2 132 is initialized to a predetermined value to ensure the actuator begins moving in the desired direction (i.e., moving in reverse toward the selected track). To accomplish this, the σ processing block 112 selects, over line 124, X2Ref 114 as the output of multiplexor 120. The σ processing block 112 also selects, over line 126, the predetermined constant C 134 as the output of multiplexor 118 (the third input ψ3 109 to adder 103). The function of the predetermined constant C 134 and the integrator 116 are discussed in further detail bellow.

After the control parameters have been initialized for the acceleration trajectory σ=σ1 80, the sliding mode controller 23 continuously computes and outputs the motor command signal U 24 at the output of adder 103. Referring to flow chart 212, σ1 is updated according to equation (13) and σi 128 is assigned to σ1. Multiplier 108 (which can be implemented as a simple XOR of the operand sign bits) multiplies σi by X2 and switches gain block 104 to γi if the result is positive and to ζi if the result is negative. Gain block 104 multiplies ~X2 132 (X2Ref 114) by the selected gain to generate ψ2. Adder 103 adds ψ1, ψ2, and ψ3 to generate the motor command U 24. Since ψ1 is zero during acceleration and ψ3 is insignificantly small, the motor command signal U 24 is predominately equal to ψ2.

As the read head 8 begins to accelerate in reverse toward the selected track, the track counter 16 updates the current track position. The state estimator 19 processes the track count 18A and the current motor command 24 to update the estimated position signal 18B. Adder 21 outputs the new position error X1 22, and differentiator 102 computes the new velocity phase state X2 100 as X1 (N)–X1 (N–1).

The σ processing block 112 continuously checks to determine when the velocity of the read head reaches a predetermined value. If X2≦X2Ref? 214 is NO, then the sliding mode controller loops around and computes the next motor command U 24 according to flow chart 212. If X2≦X2Ref? 214 is YES, then the σ processing block 112 selects, over line 124, X2 100 as the output of multiplexor 120 (setting ~X2=X2 216). In other words, once the velocity of the read head 8 (X2 100) reaches a predetermined speed (X2Ref 114), the sliding mode controller 23 generates the motor command signal U 24 in flow chart 218 as a function of the velocity phase state X2 100.

Continuing now to flow chart 218 shown in FIG. 7B, the σ processing block 112 updates σ1, σ2, and σ3 according to equations (13), (14), and (15), respectively. The output σi 128 of σ processing block 112 is assigned to σ1. In response to σi and X2, multiplier 108 sets the state of switching gain block 104 in order to drive X1 and X2 toward the σ1 80 phase trajectory of FIG. 4. The next command U 24 is generated and the read head 8 continues to move toward the selected track.

The σ processing block 112 continuously checks the location of the phase states with respect to the acceleration trajectory σ1 80 to determine when to switch to the next trajectory segment. The next trajectory segment will either be the constant velocity segment σ2 82 or, if the seek distance is sufficiently short, the deceleration segment σ3

84. By comparing the σ values, the σ processing block 112 determines when to switch to the next trajectory. If σ1≦σ3? 220 is YES, then the σ processing block 112 switches to the deceleration trajectory σ3 84. Else if σ1≦σ2? 222 is YES, then the σ processing block 112 switches to the constant velocity trajectory σ2 82. If both 220 and 222 are NO, then the sliding mode controller 23 loops around and computes the next motor command U 24 according to flow chart 2.

Figure 7C:
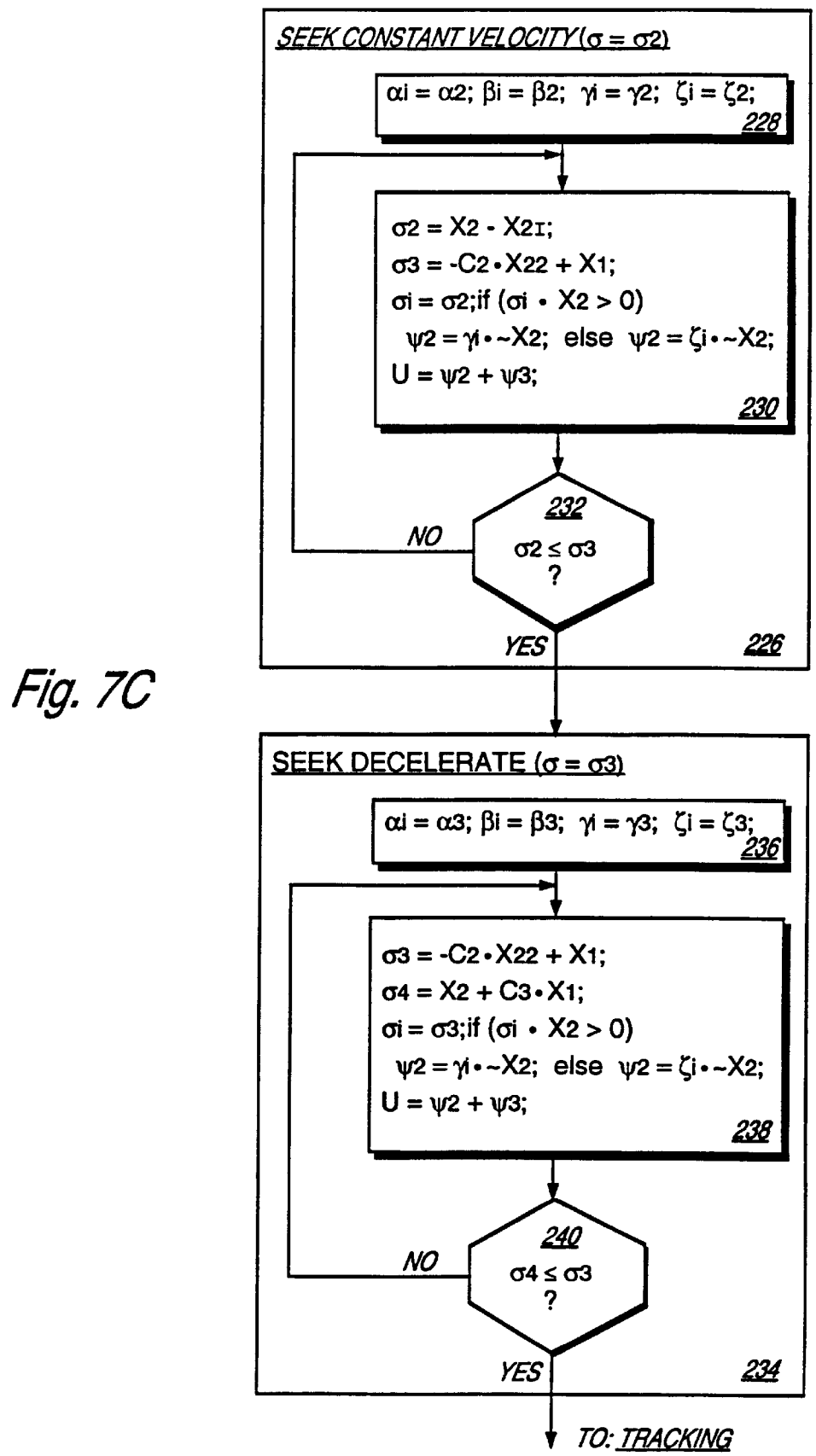

Referring now to the constant velocity flow chart 226 shown in FIG. 7C, first the gain constants for switching gain blocks 104 and 106 are updated 228 to values corresponding to the constant velocity trajectory σ2 82 of FIG. 4. Then, in flow chart 230, the σ processing block 112 updates σ2 and σ3 according to equations (14) and (15), respectively. The output σi 128 of σ processing block 112 is assigned to σ2. Again, in response to σi and X2, multiplier 108 sets the state of switching gain block 104 in order to drive X1 and X2 toward the σ2 82 phase trajectory. The next command U 24 is generated and the read head 8 continues to move toward the selected track.

The σ processing block 112 continuously checks the location of the phase states with respect to the constant velocity trajectory σ2 82 to determine when to switch to the deceleration trajectory segment σ3 84. If σ2≦σ3? 232 is YES, then the σ processing block 112 switches to the deceleration trajectory σ3 84. Otherwise, the sliding mode controller 23 loops around and computes the next command U 24 according to flow chart 230.

Continuing now to the deceleration flow chart 234, first the gain constants for switching gain blocks 104 and 106 are updated 236 to values corresponding to the deceleration trajectory σ3 84 of FIG. 4. Then, in flow chart 238, the σ processing block 112 updates σ3 and σ4 according to equations (15) and (16), respectively. The output σi 128 of σ processing block 112 is assigned to σ3. Again, in response to σi and X2, multiplier 108 sets the state of switching gain block 104 in order to drive X1 and X2 toward the σ3 84 phase trajectory. The next command U 24 is generated to decelerate the read head 8 toward the selected track.

The σ processing block 112 continuously checks the location of the phase states with respect to the deceleration trajectory σ3 84 to determine when to switch to the tracking trajectory segment σ4 86. If 94≦σ3? 240 is YES, then the σ processing block 112 switches to the tracking trajectory σ4 86. Otherwise, the sliding mode controller 23 loops around and computes the next command U 24 according to flow chart 238.

The tracking trajectory σ4 86 of FIG. 4 is executed by sliding mode controller 23 of FIG. 2A to keep the read head assembly 8 positioned over the desired track, and it is also executed by sliding mode controller 37 of FIG. 2B to keep the OL carriage unit 11 aligned over the centerline of the selected track. For short seeks (fine seeking), the sliding mode controller 37 of FIG. 2B rotates the OL carriage unit 11 according to the phase state trajectories of FIG. 4 to effectuate the entire seek instead of sliding the read head assembly 8 along the lead screw 9.

Referring again to flow chart 200 of FIG. 7A, at the beginning of a tracking operation the gain constants for switching gain blocks 104 and 106 are updated 202 to values corresponding to the tracking trajectory σ4 86 of FIG. 4. The 6 processing block 112 selects via line 126 the output of integrator 116 as the output of multiplexor 118 (i.e., ψ3). The σ processing block 112 also switches the position error phase state X1 22 back into the sliding mode computation, by selecting via line 126, as the output of multiplexor 122, the position error phase state X1 22 as the input to multiplier 110. Again, the position error phase state X1 22 is not used during seeks in order to reduce switching noise.

Referring now to flow chart 204, the σ processing block 112 updates σ4 according to equations (16). The output σi 128 of σ processing block 112 is assigned to σ4. In response to σi, X1, and X2, multipliers 108 and 110 set the state of switching gain blocks 104 and 108, respectively, in order to drive X1 and X2 toward the σ4 86 phase trajectory. The next command U 26 is generated and applied to the OL VCMs (10A,10B) to continue tracking the centerline of the selected track.

After reaching the selected track, several biasing forces can cause the OL carriage unit 11 to have a steady state DC offset from the centerline. Typical biasing forces include the radial component of the windage caused by the rotating discs, tilt of the disc stack, biases in the flexible cables, and electrical offsets. To compensate for these biasing forces and drive the steady state position error to zero, an integrator 116 integrates the position error phase state X1 22 and its output 109 is summed 103 into the output 26 of the sliding mode controller 37.

The biasing forces do not vary with time, however, they do vary with the radial position of the OL carriage unit 11. Therefore, the steady state integration value 109 corresponding to the biasing forces for each track is stored in memory. When seeking a selected new track, the integrator 116 is disabled and the steady state integration value stored in memory corresponding to the selected new track is added 103 as a constant 134 to the control signal 26. When the OL carriage unit 11 reaches the selected new track and the head has settled sufficiently, the integrator 116 is re-enabled and its output added 103 back into the control signal 26.

For reverse seeks, the sliding mode controller (23,37) operates as described in the flow charts of FIGS. 7A, 7B, and 7C except that the inequalities are reversed. The σ processing block 112 can also adjust the slope of the linear phase trajectory segment as shown in FIG. 3D. An alternative embodiment of the σ processing block 112 would be to compare the position error and velocity phase states to values stored in a look up table where the stored values represent the phase plane trajectory shown in FIG. 4.

Acceleration Embodiment

Figure 8:
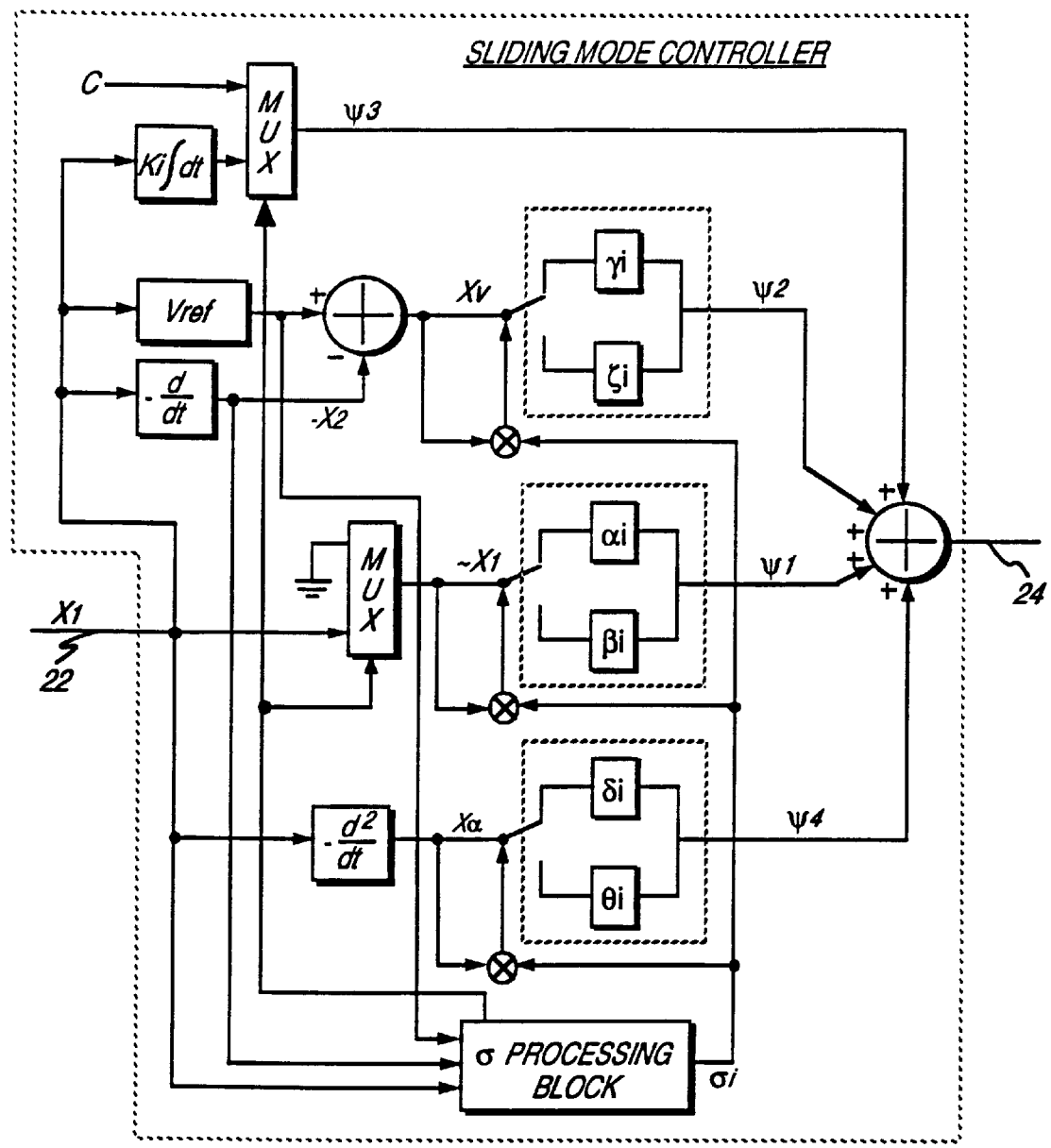
FIG. 8 is a detailed block diagram of an alternative embodiment of the present invention where the sliding mode controller is responsive to an actuator position error, velocity error, and acceleration phase states.

An alternative embodiment for the sliding mode controller of the present invention is shown in FIG. 8. The sliding mode operation is the same as that of FIG. 6 during the constant velocity seek mode (σ=σ2) and the tracking mode (σ=σ4). During seek accelerate (σ=σ1) and seek decelerate (σ=σ3), however, the state space is defined in the plane (Xv, Xα), where Xv is an actuator velocity error phase state and Xα is an actuator acceleration phase state.

During seek accelerate and seek decelerate, a reference velocity Vref is generated as a function of the position error X1 corresponding to the velocity profiles σ1 80 and σ3 84 shown in FIG. 4. The reference velocity generator can be implemented with a lookup table or with polynomial equations. An actuator velocity error phase state Xv is generated by subtracting an estimated actuator velocity -X2 from the reference velocity Vref. An actuator acceleration phase state Xα is generated by taking the second derivative of the position error X1. Phase states Xv and Xα are multiplied by respective switching gain blocks to generate control signals ψ2 and ψ4. As discussed with reference to FIG. 6 and 7, control signal ψ1 is disabled during seeks and ψ3 is insignificantly small. Therefore, the motor control signal U is a function of ψ2 and ψ4 during seek accelerate and seek decelerate. During seek at constant velocity (σ=σ2) and tracking (σ=σ4), Vref is set to zero such that Xv=X2, and ψ4 is disabled by setting the gains δ and θ in the switching gain block to zero. In this manner, the sliding mode controller of FIG. 8 operates as described in FIG. 6 and 7 during seek at constant velocity and tracking.

The trajectory segments σi used by the σ processing block of FIG. 8 are defined as:

σ1=[Xv−C1·Xa];

σ2=X2−X2I;

σ3=−[Xv−C2·Xa];

σ4=X2+C3·X1; where

C1=a predetermined acceleration constant;
X1I=an initial actuator position error;
X2I=a predetermined constant position error velocity;
C2=a predetermined deceleration constant; and
C3=a predetermined slope of the linear deceleration segment.

The σ processing block switches between trajectory segments according to the following inequalities:

σ1 to σ2 when |X2|>X2I;

σ2 to σ3 when |Vref(k)|<|Vref(k−1)|;

σ3 to σ4 when |X1|<predetermined track acquire threshold; and

σ1 to σ3 when (X1 * Xv<0) and (|X2|≦|V2I|).

Boundary Layer

Figure 9:
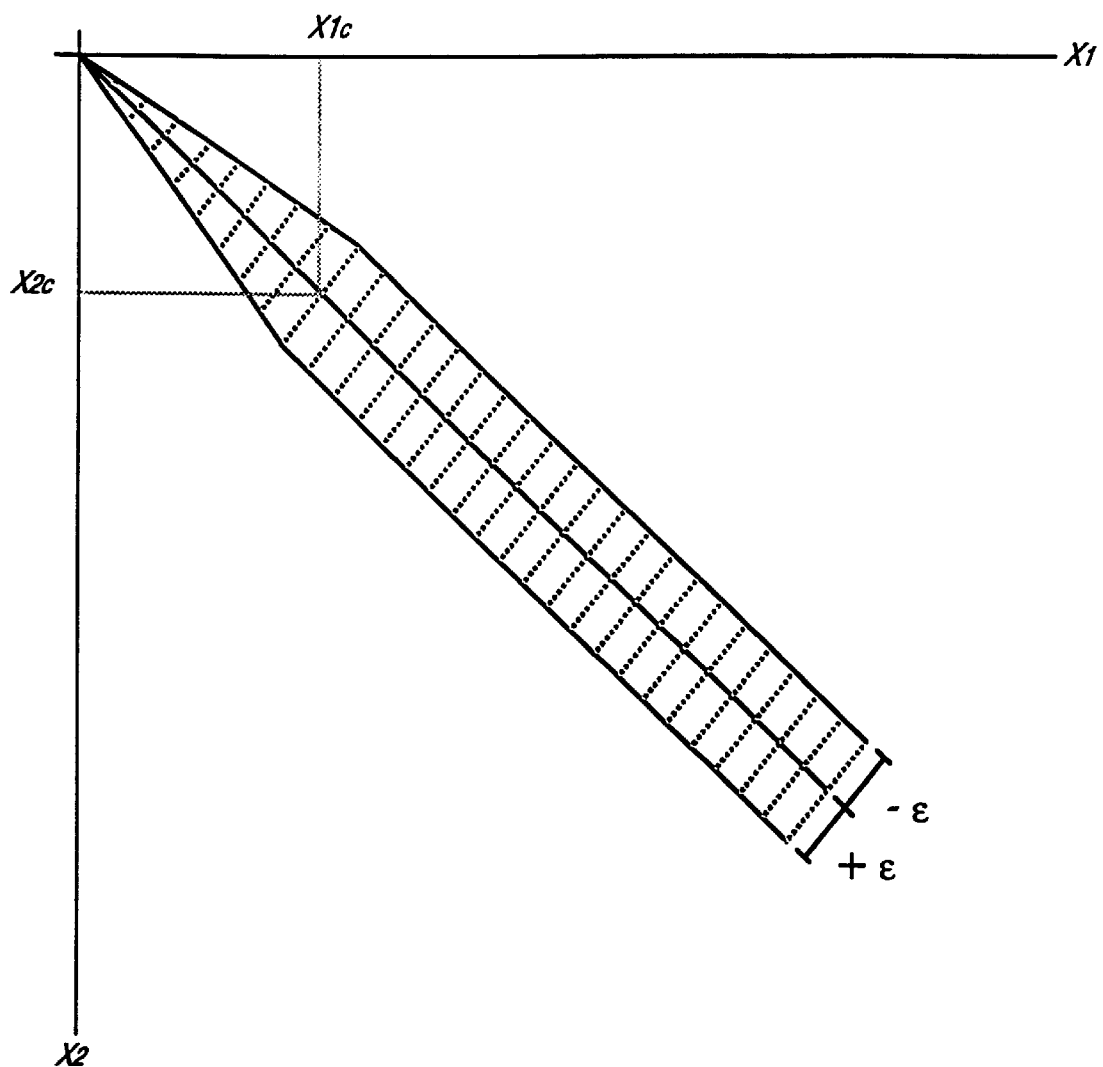
FIG. 9 illustrates a converging boundary layer around the sliding mode phase state trajectory.

The sliding mode controller of the present invention provides further improvements in chatter reduction by defining a boundary layer around the sliding trajectory σ. This is illustrated in FIG. 9 which shows a linear segment for the sliding trajectory σ having a boundary layer defined as an offset ±ε added to σ. The boundary layer reduces chatter by reducing the amount of switching in the system. Without the boundary layer, the switching gain blocks 104 and 106 of FIG. 6 will switch every time the phase states cross the sliding line (i.e., every time σ changes sign). The boundary layer results in hysteresis which causes the gain blocks to switch only after the phase states cross over the boundary line.

The boundary layer offset ±ε added to the sliding line σ is a predetermined constant until the phase states reach a predetermined value $(X1_c, X2_c)$ at which time the offset ±ε is computed as the sum of the phase states X1 and X2 so that the boundary layer converges to the origin of the phase plane, as shown in FIG. 9, in order to prevent oscillations around the origin. The σ processing block 112 of FIG. 6 computes σi as follows:

if switching gain blocks (104,106) are set to select gains (γi,αi) then

σi=σ+ε;

else if switching gain blocks (104,106) are set to select gains (ζi,βi) then

σi=σ−ε; where:

σ=X2+C·X1;

ε=constant for $X1>X1_c$ and $X2>X2_c$; and

ε=|X1|+|X2| for $X1≦X1_c$ and $X2≦X2_c$.

In an alternative embodiment, rather than compute ε as the sum of X1 and X2 when $X1≦X1_c$ and $X2≦X2_c$, the slope of the sliding line is changed (i.e., σ=X2+$C_1$·X1; or σ=X2+$C_2$·X1; depending on the current state of the switching gain blocks (104,106)).

Smoothing Function

The sliding mode controller of the present invention achieves still better chatter reduction by generating the control signal U proportional to an integral of sgn (σ). In effect, the control signal is smoothed to attenuate the high frequency components that can generate electromagnetic and/or acoustic emissions.

Figure 10:
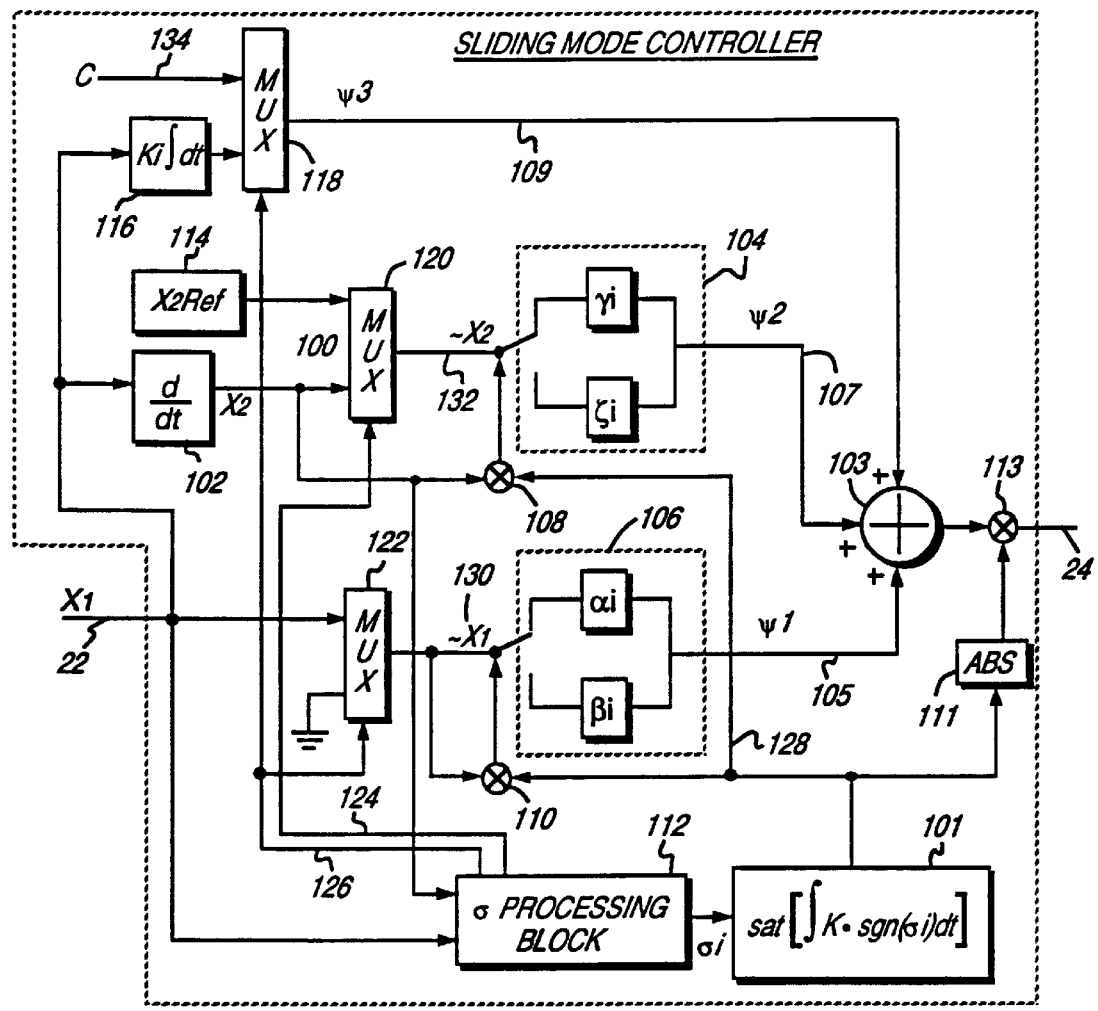
FIG. 10 shows an integrator for integrating sgn ($\sigma$) in order to smooth the motor control signal.

In an embodiment of the present invention, as shown in FIG. 10, σi from σ processing block 112 is input into an integrating block 101 which computes the following function:

$$sat\left[\int K \cdot \mathrm{sgn}(\sigma_i) dt\right]; \text{ where:}$$

$$sat(x) = \begin{cases} -1 & \text{for } x < -1; \\ x & \text{for } -1 \leq x \leq 1; \\ +1 & \text{for } x > 1. \end{cases}$$

The output 128 of the integrating block 101 controls the state of switching gain blocks (104,106) and is also input into an absolute value function 111. The control signal at the output of adder 103 is then attenuated by the absolute value of the integrated sgn(σi) through a multiplier 113 to generate the smoothed control signal U.

Although the smoothing function of the present invention has been described as a modification to the controller of FIG. 6, the same modification is equally applicable to the controller of FIG. 8.

Lookup Table

The σ processing block 112 of the present invention can be implemented using a lookup table rather than switching between trajectory segments. As mentioned previously, the phase states can be used as an index into a lookup table in order to implement the phase state trajectory σ. To reduce the size of the table, the phase state trajectory is redefined according to the following derivation:

distance=½·Acc·t² implies $$X1-X1I=\tfrac{1}{2} \cdot Acc \cdot t^2; \text{ where:} \quad (27)$$

X1I=an initial actuator position error;
Acc=a predetermined acceleration/deceleration constant; and
t=time.

solving for t in equation (27) provides:

$$t=(2 \cdot (X1-X1I)/Acc)^{1/2} \quad (28)$$

Since velocity=−X2=Acc·t, then after substituting t from equation (28) provides:

$$X2(\text{Ideal})=-(2 \cdot (X1-X1I) \cdot Acc)^{1/2} \quad (29)$$

Figure 11:
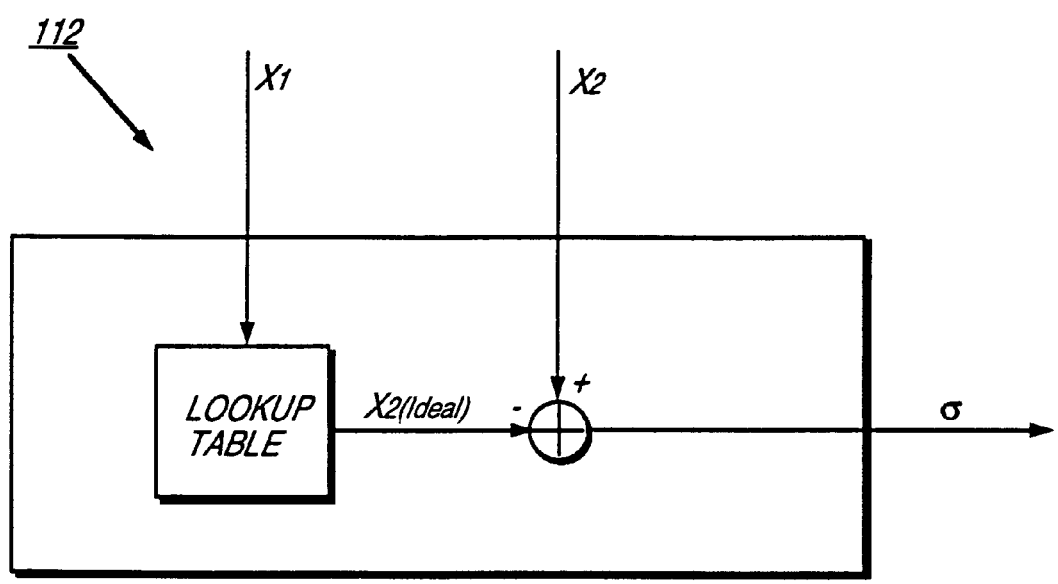
FIG. 11 shows a preferred lookup table embodiment of the σ processing block in the sliding mode controller.

During seeks, the phase state trajectory σ is defined as:

$$\sigma=X2+(2 \cdot (X1-X1I) \cdot Acc)^{1/2}=0 \quad (30)$$

where X2 (Ideal) in equation (29) is the ideal actuator velocity and X2 in equation (30) is the estimated actuator velocity. The ideal velocity of equation (29) can be computed using a lookup table indexed by one phase state, X1, thereby reducing the size of the lookup table and the overall cost of the sliding mode controller. FIG. 11 illustrates the lookup table implementation of the σ processing block 112.

Binary Coefficients

As described in detail above, the various gain values in switching gain blocks 104 and 106 of FIG. 6 are programmably set to appropriate values according to the trajectory segment being followed by the phase states and whether the controller is executing a forward or reverse seek. Using the existence equation (11) and the phase state trajectory equations (13), (14), (15) and (16), appropriate ranges for the gain values for each segment of the phase state trajectory shown in FIG. 4 were determined.

In an alternative embodiment of the present invention, the sliding mode controllers for focus, seeking and tracking are implemented using binary coefficients. That is, the various gain values in switching gain blocks 104 and 106 are selected from the set $2^n$, where n is a positive or negative integer. Binary coefficients may be used for the switching gains because the gains need only be within a predetermined range as discussed above. Consequently, the memory requirements for storing the coefficients is reduced and complex hardware multipliers are obviated; that is, multiplying by binary coefficients can be accomplished using only shift registers.

Experimental Results

Figure 12A:
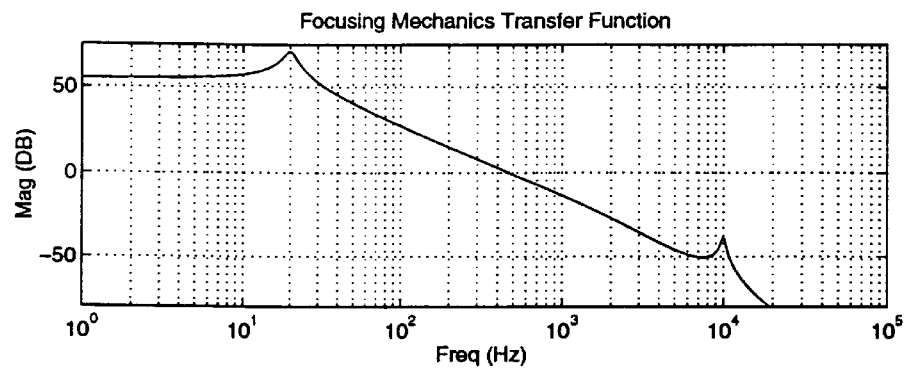
FIG. 12A and 12B illustrate a simulated frequency and phase response of a typical focus servo loop in an optical disc drive.
Figure 12B:
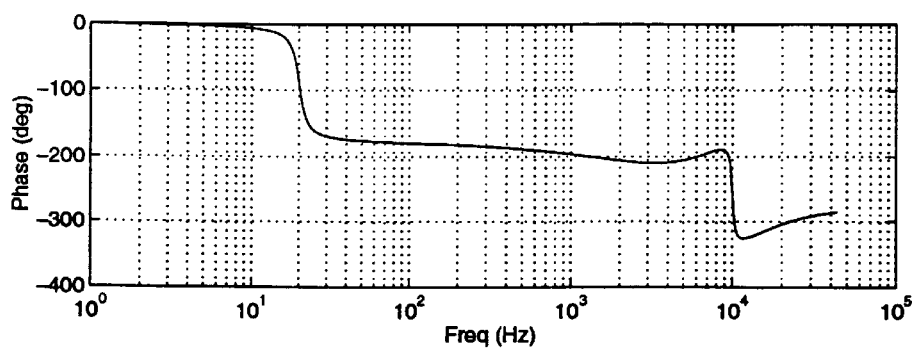
Figure 13:
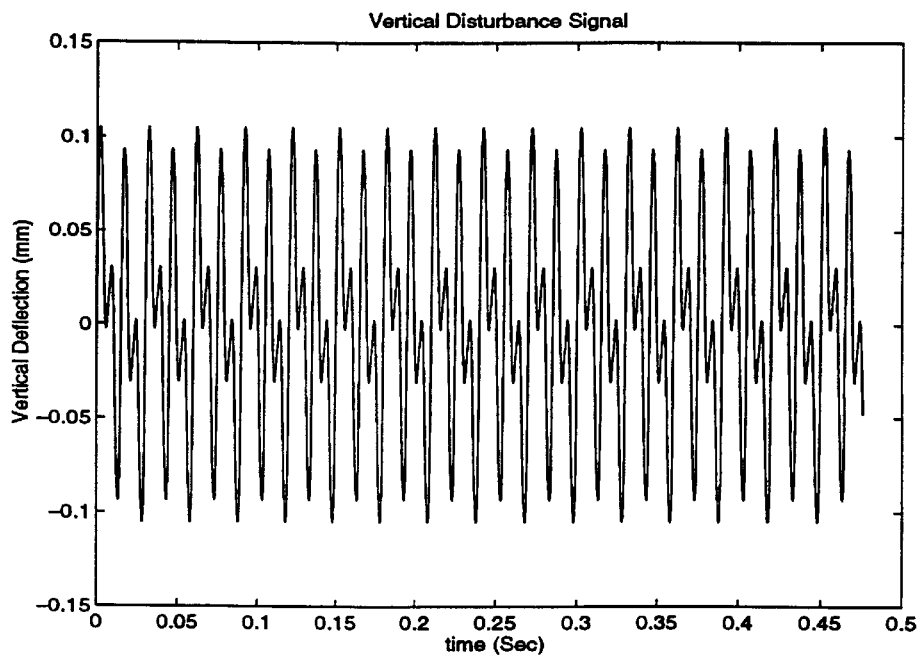
FIG. 13 shows a nominal focus reference which was injected into the simulated focus servo loop of FIG. 12 for demonstrating performance of sliding mode control of the present invention as compared to conventional linear control.
Figure 14A:
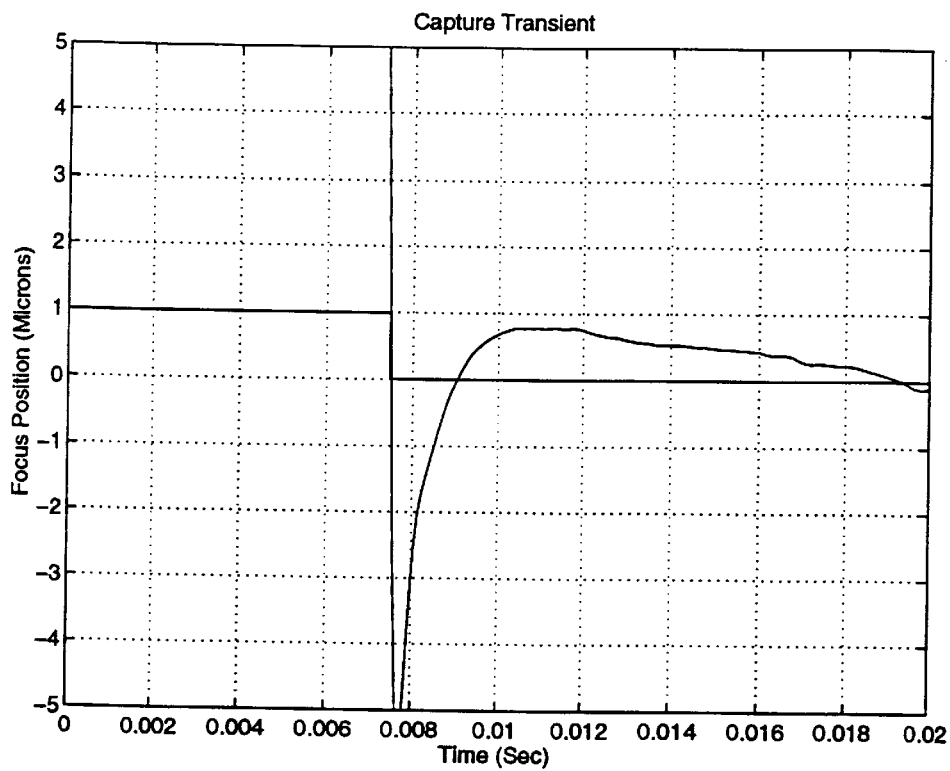
FIG. 14A shows, for the nominal reference of FIG. 13, the response of a conventional linear controller to the focus capture transient.
Figure 14B:
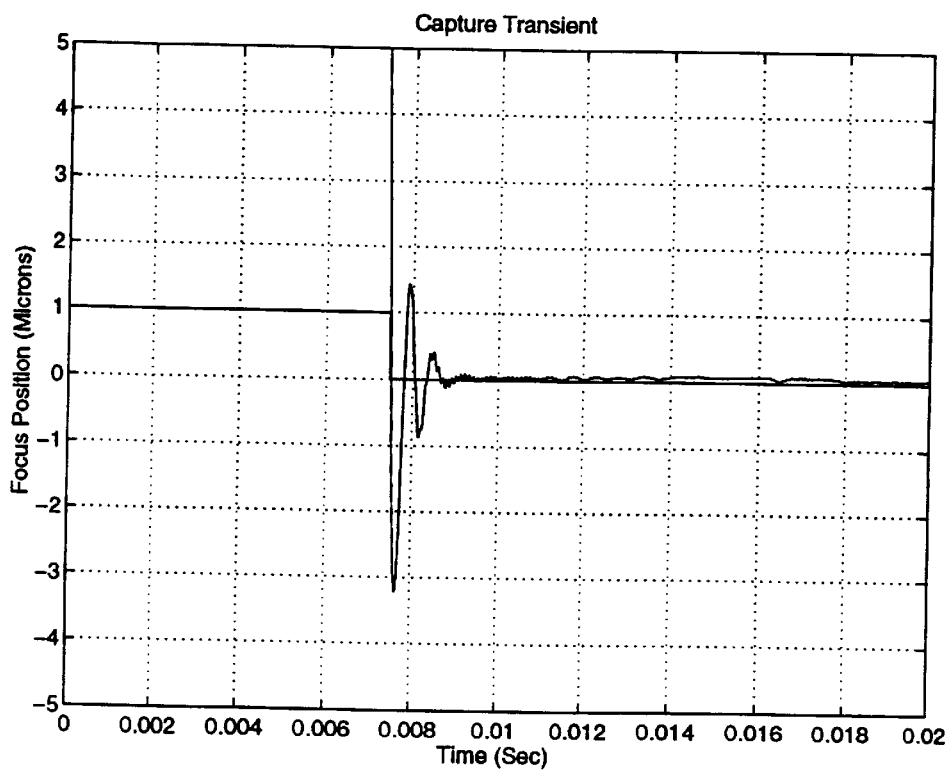
FIG. 14B shows, for the nominal reference of FIG. 13, the response of the sliding mode controller of the present invention to the focus capture transient.
Figure 15A:
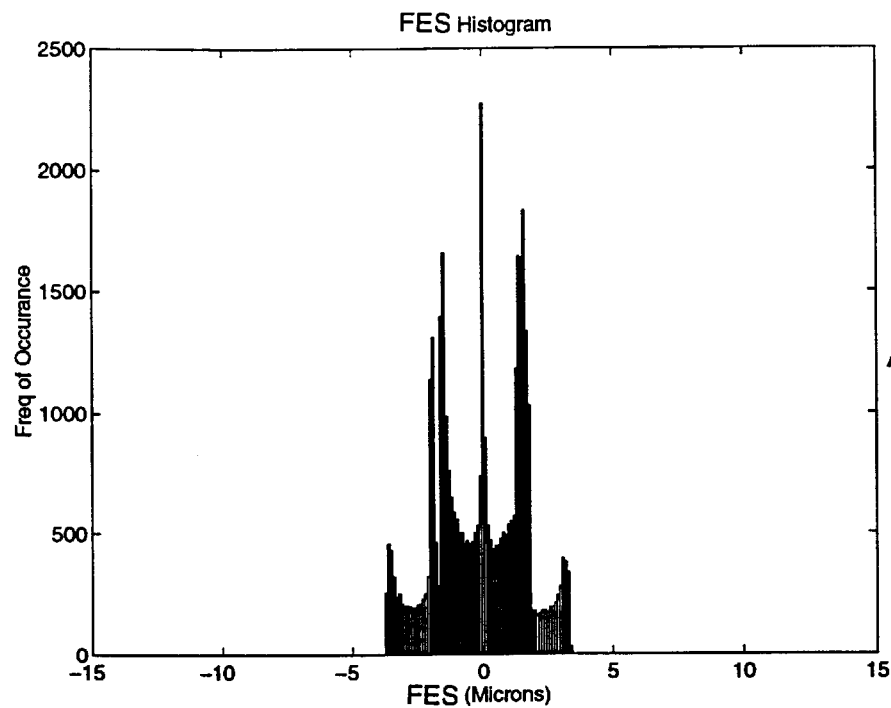
FIG. 15A is a resulting histogram of the focus error signal during focus tracking when simulating the focus servo loop using the nominal reference signal of FIG. 13 and a conventional linear controller.
Figure 15B:
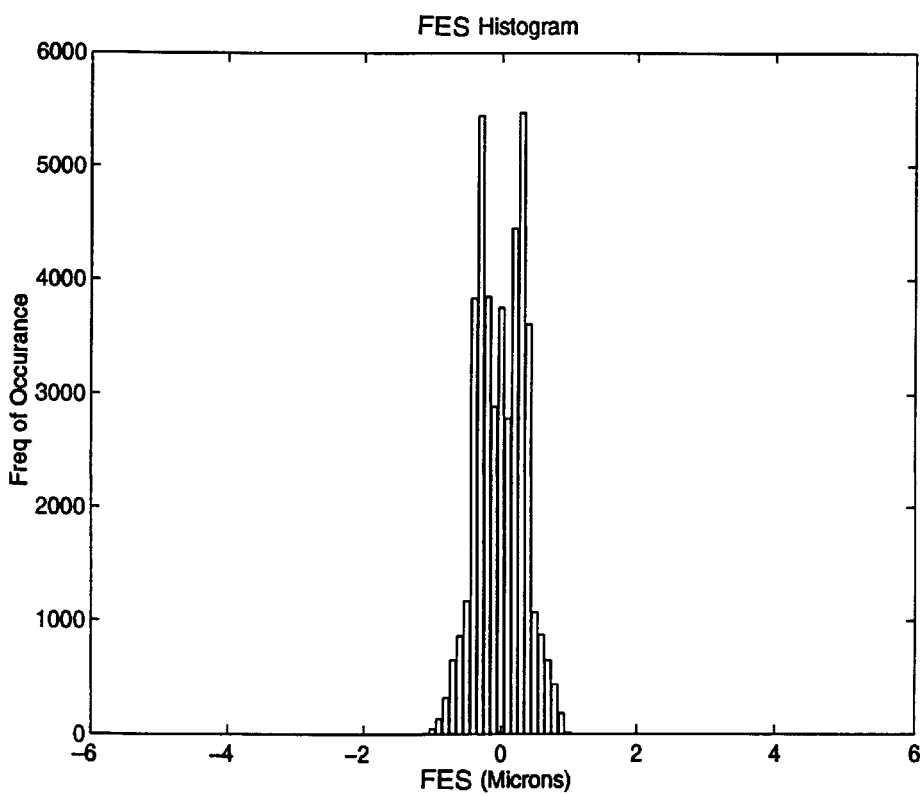
FIG. 15B is a resulting histogram of the focus error signal during focus tracking when simulating the focus servo loop using the nominal reference signal of FIG. 13 and the sliding mode controller of the present invention.
Figure 16A:
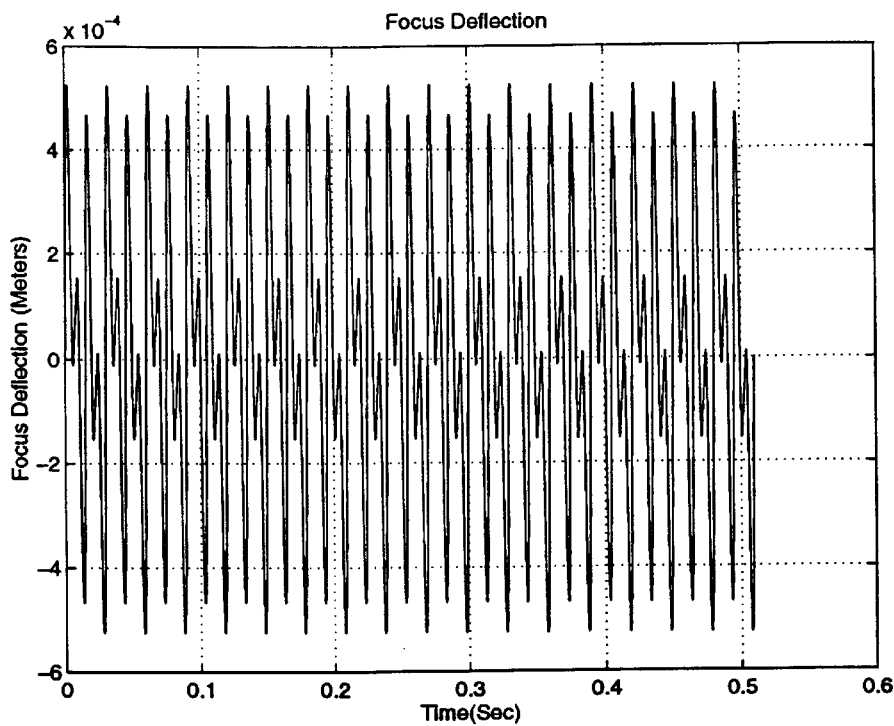
FIG. 16A is a worst case focus reference signal injected into the simulated focus servo loop of FIG. 12.
Figure 16B:
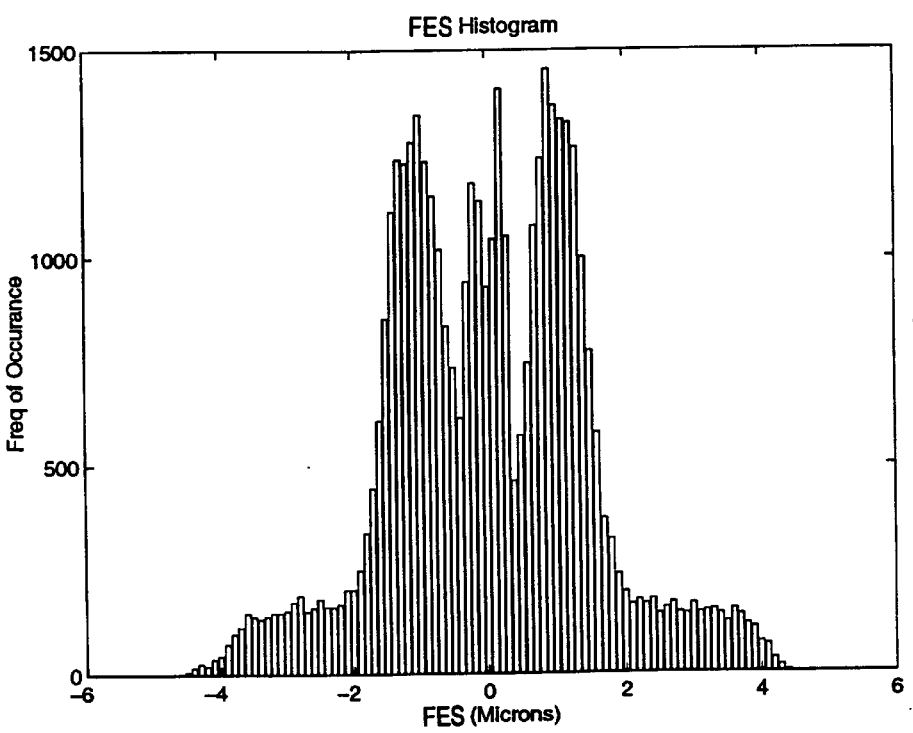
FIG. 16B is a resulting histogram of the focus error signal during focus tracking when simulating the focus servo loop using the worst case reference signal of FIG. 16A and the sliding mode controller of the present invention.

In order to verify operability, the present invention was simulated according to a computer generated model of the optical disc drive and sliding mode controller. For the focus aspect, the optical transport mechanical transfer function was characterized with the frequency and phase response shown in FIG. 12A and 12B. The focus control loop was then simulated with a nominal focus reference shown in FIG. 13. FIG. 14B illustrates the response of the sliding mode controller of the present invention to the capture transient which is much better than for a typical linear controller as shown in FIG. 14A. Also, FIG. 15B shows a histogram of the focus error signal (FES) during focus tracking and, as compared to the conventional linear controller of FIG. 15A, sliding mode control operates within the required 5 micron deviation. Further, however, sliding mode control better compensates for parametric variations and external load disturbances. Even under a worst case focus reference condition as shown in FIG. 16A, an optical disc drive system employing the present invention remained in focus as shown in FIG. 16B without plant modifications; whereas a system employing conventional linear control could not maintain the required 5 micron deviation.

Figure 17:
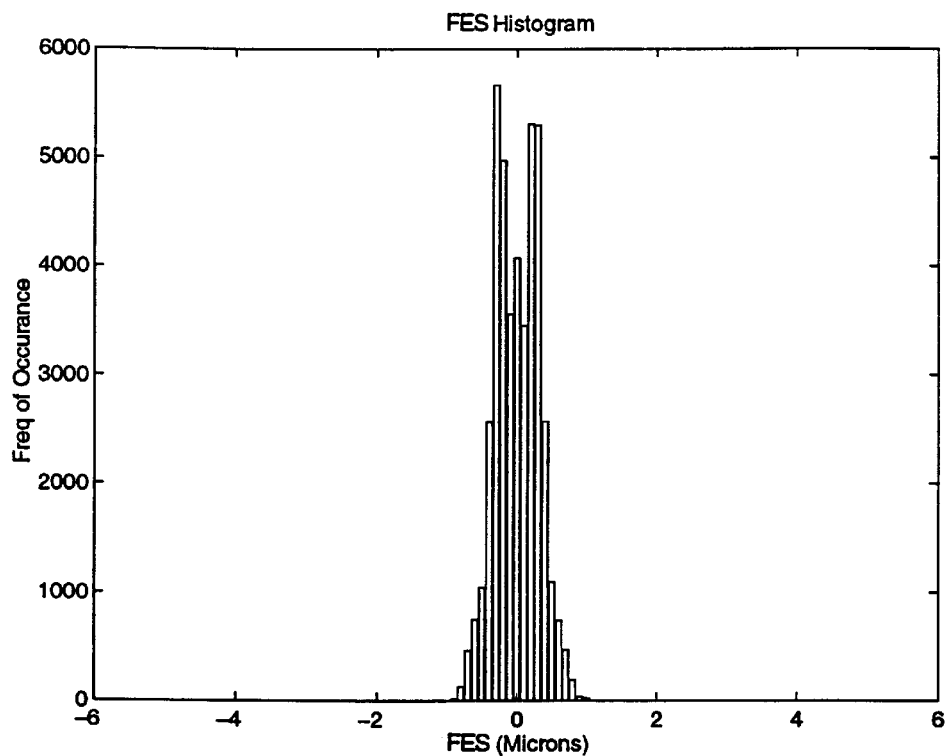
FIG. 17 shows, for sliding mode control, a histogram of the focus error during focus tracking when the force constant is increased by 25%.
Figure 18:
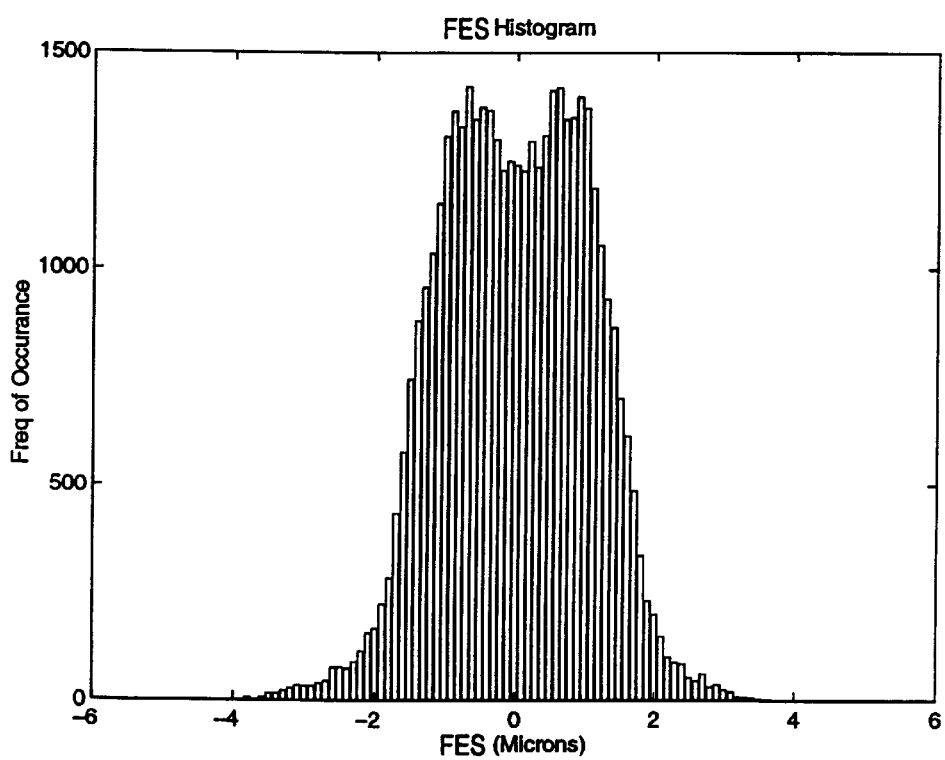
FIG. 18 shows, for sliding mode control, a histogram of the focus error during focus tracking when the force constant is decreased by 50%.
Figure 19:
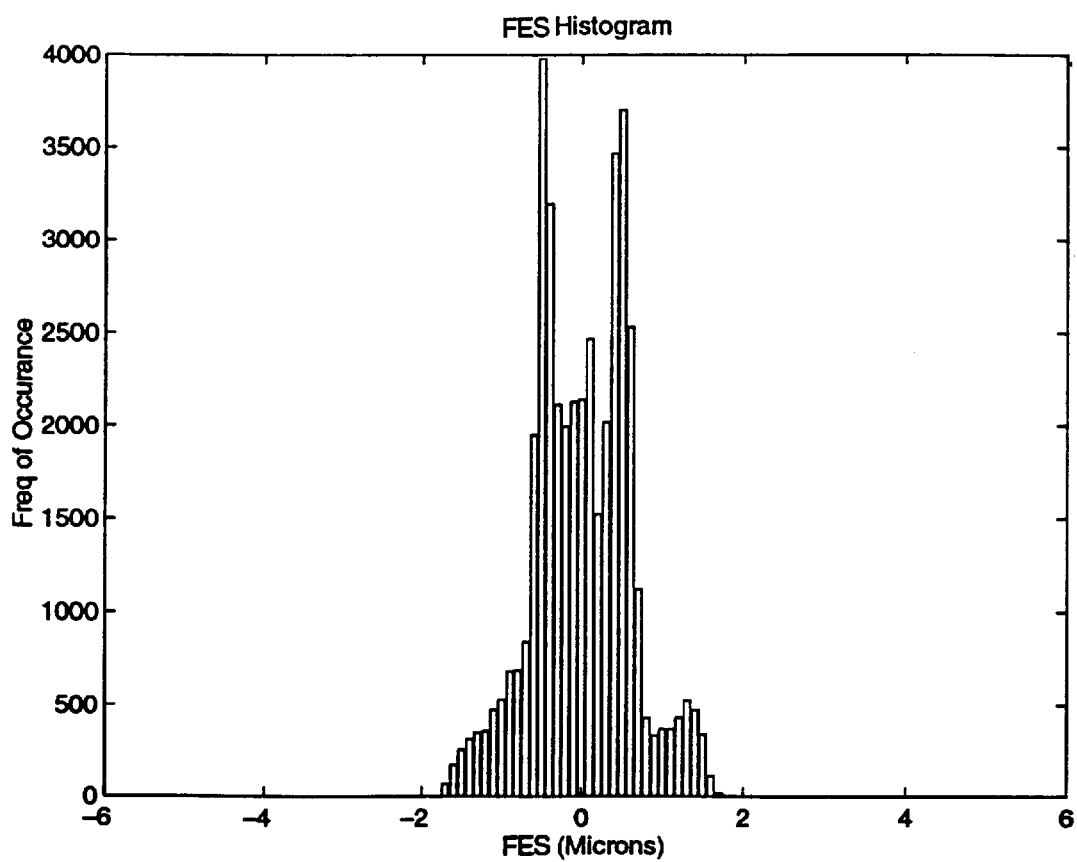
FIG. 19 shows, for sliding mode control, a histogram of the focus error during focus tracking when the resonant peak at 10 kHz is increased by 10 dB.

Additional simulations, using the same control gains as above, were performed using mechanics with non-nominal characteristics. FIG. 17 shows the steady state focus histogram when the focus actuator force constant (Kt in FIG. 5) is increased by 25%. FIG. 18 shows the steady state focus histogram when the force constant is decreased by 50%. FIG. 19 shows the steady state focus histogram when the resonance peak 10 kHz is increased by 10 dB. As shown by these figures, even with the binary coefficients the present invention operates acceptably with a variety of parametric variations and references.

Figure 20A:
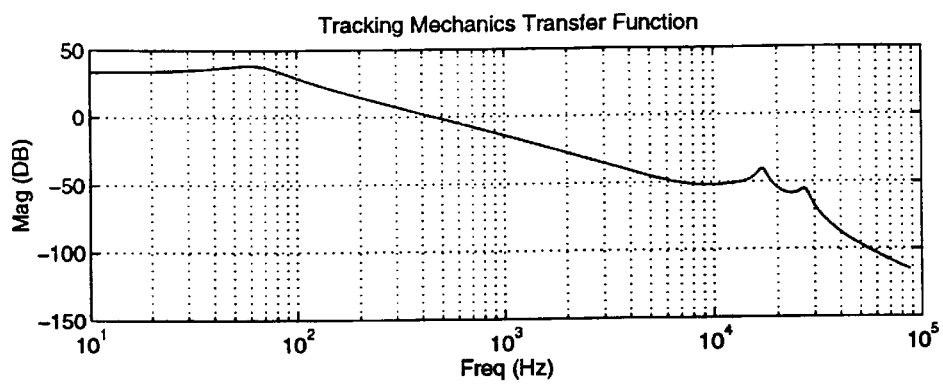
FIGS. 20A and 20B show the frequency and phase response of a typical centerline servo tracking system in an optical disc drive used to simulate operation of the present invention.
Figure 20B:
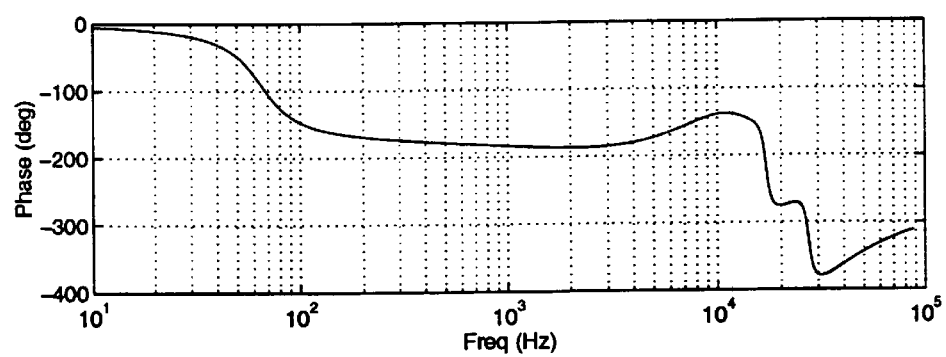
Figure 21:
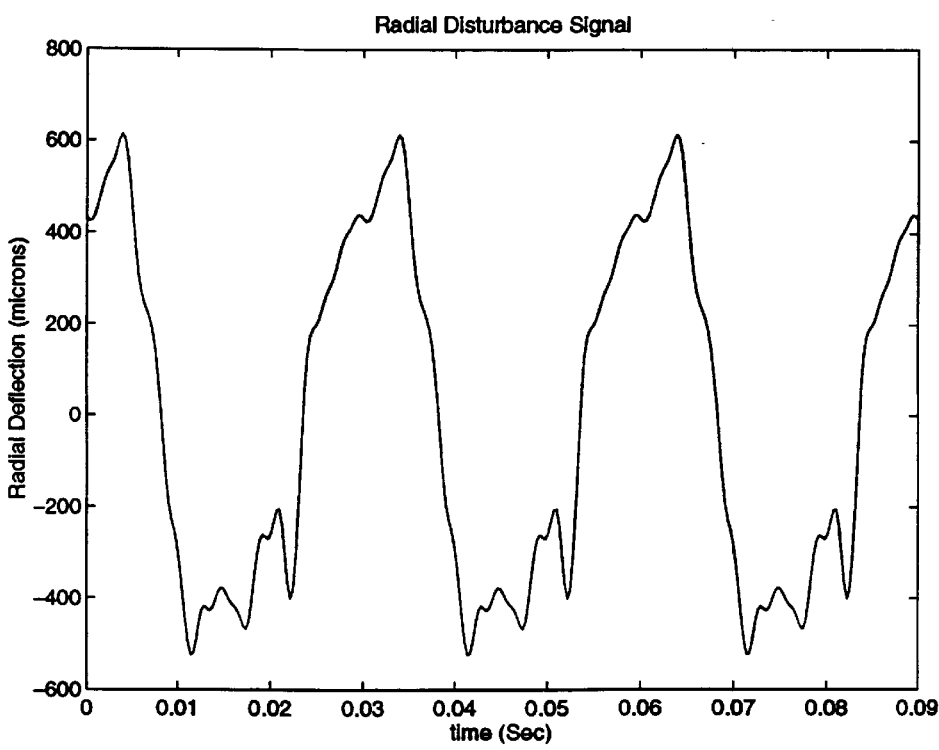
FIG. 21 shows a nominal radial reference which was injected into the simulated centerline servo tracking system of FIG. 20 for demonstrating the performance of sliding mode control of the present invention as compared to conventional linear control.
Figure 22A:
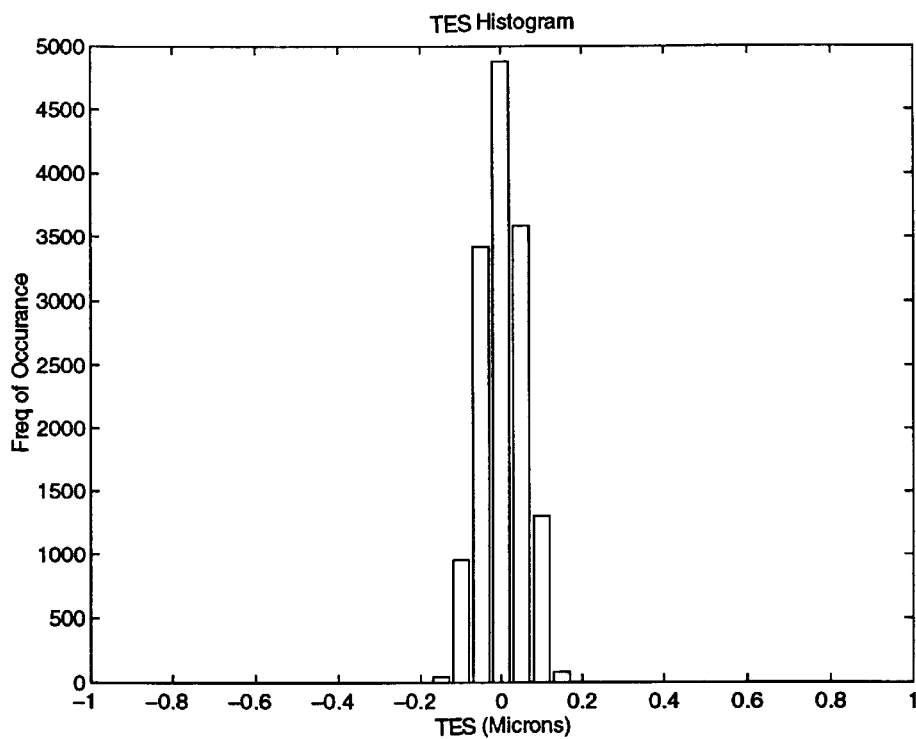
FIG. 22A is a resulting histogram of the tracking error signal during centerline tracking when simulating the tracking servo loop using the nominal reference signal of FIG. 21 and a conventional linear controller.
Figure 22B:
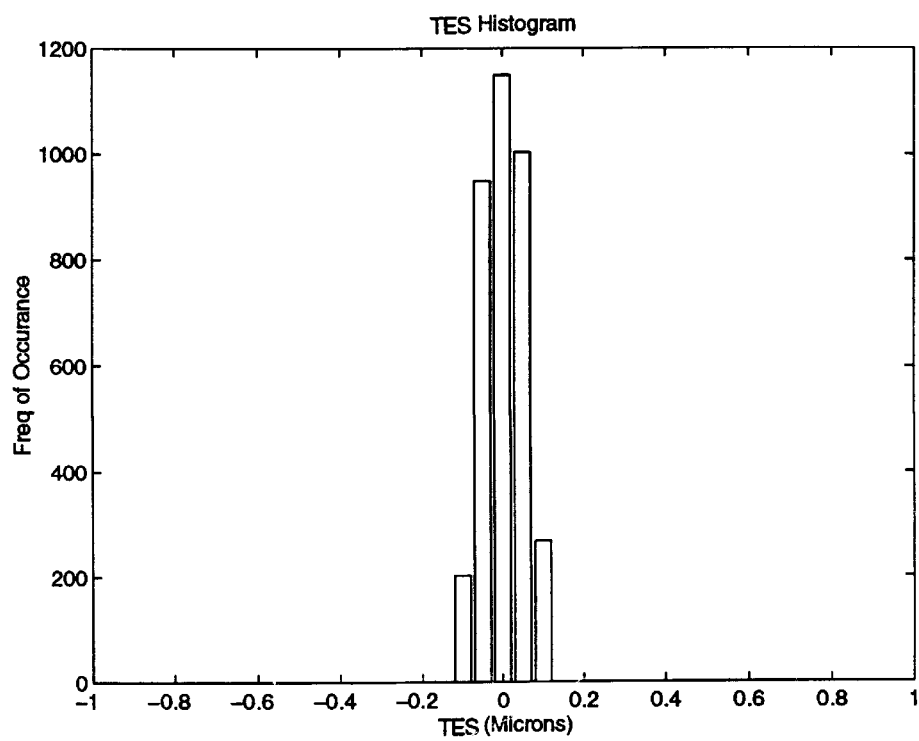
FIG. 22B is a resulting histogram of the tracking error signal during centerline tracking when simulating the tracking servo loop using the nominal reference signal of FIG. 21 and the sliding mode controller of the present invention.

For centerline tracking, the mechanical transfer function was characterized with the frequency and phase response shown in FIG. 20A and 20B. The tracking aspect of the present invention was simulated with a nominal tracking reference shown in FIG. 21. The resulting histogram for centerline tracking error (TES) using sliding mode control is shown in FIG. 22B. Again, as compared to the histogram for a conventional linear control system shown in FIG. 22A, sliding mode control maintains the tracking error within a 0.2 micron deviation while better compensating for parametric variations and external load disturbances.

Many changes in form and detail could be made without departing from the scope of the present invention; the particular embodiments disclosed are not intended to be limiting. For instance, the sliding mode controller may be implemented in hardware or software and in continuous or discrete time, and higher order phase states could be used in place of, or in addition to, the particular phase states disclosed. These and other modifications derived from the disclosed embodiment are within the intended scope of the present invention as properly construed from the following claims.

We claim:

1. An optical disc drive storage system for recording digital data, comprising:

(a) at least one rotating optical disc comprising a plurality of data tracks recorded thereon;

(b) an optical read head positioned over the optical disc for reading the digital data from the optical disc;

(c) an actuator connected to the read head for positioning the read head over the optical disk;

(d) a motor connected to the actuator comprising an input for receiving a motor control signal, the motor for controlling the motion of the actuator;

(e) a phase state generator for generating at least one phase state signal; and (f) a sliding mode controller, responsive to the at least one phase state signal, for generating the motor control signal;

wherein:

the optical disc drive storage system comprises at least two phase states;

the sliding mode controller switches between a first and a second structure;

the first structure causes the two phase states to chance relative to a phase plane to follow a first phase trajectory;

the second structure causes the two phase states to chance relative to the phase plane to follow a second phase trajectory;

the first and second phase trajectories intersect in opposite directions in at least part of the phase plane; and by switching between the first and second structures the sliding mode controller causes the two phase states to change relative to the phase plane to substantially follow a predetermined third phase trajectory.

2. The optical disc drive storage system as recited in claim 1, wherein the phase state generator comprises a state estimator.

3. The optical disc drive storage system as recited in claim 1, wherein the sliding mode controller operates in a seek mode to move the read head from a current track to a selected track.

4. The optical disc drive storage system as recited in claim 1, wherein the sliding mode controller operates in a tracking mode to maintain the read head over a centerline of a selected track.

5. The optical disc drive storage system as recited in claim 1, wherein the sliding mode controller operates in a focus mode to maintain the read head in a focus position over the disk.

6. The optical disc drive storage system as recited in claim 1, wherein the at least one phase state signal comprises an actuator position error signal proportional to a difference between a desired actuator position and an estimated actuator position.

7. The optical disc drive storage system as recited in claim 1, wherein the at least one phase state signal comprises an actuator position error velocity signal proportional to a derivative of an actuator position error.

8. The optical disc drive storage system as recited in claim 1, wherein the at least one phase state signal comprises an actuator velocity error signal proportional to a difference between a reference actuator velocity and an estimated actuator velocity.

9. The optical disc drive storage system as recited in claim 1, wherein the at least one phase state signal comprises an actuator acceleration signal proportional to a derivative of an actuator velocity.

10. The optical disc drive storage system as recited in claim 1, wherein:
   (a) the first structure comprises a first multiplier for multiplying a positive gain term by the at least one phase state signal; and
   (b) the second structure comprises a second multiplier for multiplying a negative gain term by the at least one phase state signal.

11. The optical disc drive storage system as recited in claim 10, wherein the positive gain term and the negative gain term are selected from the set consisting of $2^n$ where n is an integer.

12. The optical disc drive storage system as recited in claim 1, wherein:
   (a) the third phase trajectory comprises a first substantially parabolic segment having an originating end and a terminating end connected to an originating end of a first substantially linear segment;
   (b) the first substantially linear segment having a terminating end connected to an originating end of a second substantially parabolic segment;
   (c) the second substantially parabolic segment having a terminating end connected to an originating end of a second substantially linear segment; and
   (d) a part of the second substantially linear segment is near the origin of the phase plane.

13. The optical disc drive storage system as recited in claim 12, wherein:
   (a) the servo controller operates in a seek mode to move the read head from a current track to a selected track and in a tracking mode to keep the read head substantially aligned over a centerline of the selected track while reading the data recorded on the disc;
   (b) when the servo controller switches to seek mode in order to move the read head to the selected track, the sliding mode controller switches between the first and second structure repeatedly according to a first switching algorithm so that the two phase states follow the first substantially parabolic segment, thereby accelerating the read head toward the selected track;
   (c) when the two phase states substantially reach the originating end of the first substantially linear segment, the sliding mode controller switches between the first and second structures repeatedly according to a second switching algorithm so that the two phase states follow the first substantially linear segment, thereby moving the read head toward the selected track at a substantially constant velocity;
   (d) when the two phase states substantially reach the originating end of the second substantially parabolic segment, the sliding mode controller switches between the first and second structures repeatedly according to a third switching algorithm so that the two phase states follow the second substantially parabolic segment, thereby decelerating the read head toward the selected track;
   (e) when the two phase states substantially reach the originating end of the second substantially linear segment, the sliding mode controller switches between the first and second structures repeatedly according to a fourth switching algorithm so that the two phase states follow the second substantially linear segment, thereby decelerating the read head toward the selected track; and
   (f) when the two phase states are within a predetermined minimum distance from the part of the second substantially linear segment near the origin of the phase plane, the servo controller switches to the tracking mode and the sliding mode controller continues switching between the two structures repeatedly in order to keep the two phase states near the origin of the phase plane, thereby keeping the read head near the centerline of the selected track.

14. The optical disc drive storage system as recited in claim 1, further comprising switching logic, responsive to the at least one phase state signal, for controlling the switching between the first and second structures.

15. An optical disc drive storage system for recording digital data, comprising:
   (a) at least one rotating optical disc comprising a plurality of data tracks recorded thereon;
   (b) an optical read head positioned over the optical disc for reading the digital data from the optical disc;
   (c) an actuator connected to the read head for positioning the read head over the optical disk during a seek mode by moving the read head radially over the optical disc toward a target data track;
   (d) a motor connected to the actuator comprising an input for receiving a motor control signal, the motor for controlling the motion of the actuator;
   (e) a phase state generator for generating at least one phase state signal; and
   (f) a sliding mode controller, responsive to the at least one phase state signal, for generating the motor control signal, comprising:
      (i) a first switching gain block having a first and second gain value connected to receive a first actuator phase state signal;
      (ii) a second switching gain block having a third and fourth gain value connected to receive an actuator position error signal X1; and
      (iii) a means for attenuating the effect of the second switching gain block during at least part of the seek mode.

* * * * *